United States Patent [19]
Saito et al.

[11] Patent Number: 5,402,763
[45] Date of Patent: Apr. 4, 1995

[54] METHOD OF CONTROLLING AN ENGINE FOR A FLEXIBLE FUEL VEHICLE

[75] Inventors: Yoichi Saito; Takamitsu Kashima; Masaru Kurihara, all of Tokyo, Japan

[73] Assignee: Fuji Jukogyo Kabushiki Kaisha, Tokyo, Japan

[21] Appl. No.: 796,459

[22] Filed: Nov. 22, 1991

[30] Foreign Application Priority Data

Nov. 27, 1990 [JP] Japan .................. 2-327608
Dec. 27, 1990 [JP] Japan .................. 2-408076
Jul. 19, 1991 [JP] Japan .................. 3-179939

[51] Int. Cl.$^6$ .......................... F02N 17/04
[52] U.S. Cl. .................. 123/491; 123/179.21; 123/1 A
[58] Field of Search .......... 123/179.21, 1 A, 491, 123/575

[56] References Cited

U.S. PATENT DOCUMENTS 5,038,730 8/1991 Kashima .................. 123/179.21
5,044,331 9/1991 Suga et al. ............... 123/491

FOREIGN PATENT DOCUMENTS 55-35179 3/1980 Japan .
57-52665 3/1982 Japan .
64-69768 3/1989 Japan .
2-5745 1/1990 Japan .

Primary Examiner—Andrew M. Dolinar
Attorney, Agent, or Firm—Martin A. Farber

[57] ABSTRACT

It is determined whether an engine for a flexible fuel vehicle is in a start enabling state based on alcohol concentration of fuel supplied to the engine. When it is determined that the engine is in the start enabling state, a heater for vaporizing fuel is energized. Current flowing in the heater is compared with a reference current representing completion of warmup of the engine. When the current becomes smaller than the reference current, the heater is de-energized, and the fuel is injected to start the engine.

26 Claims, 38 Drawing Sheets

METHOD OF CONTROLLING AN ENGINE FOR A FLEXIBLE FUEL VEHICLE

BACKGROUND OF THE INVENTION

The present invention relates to a method of controlling an engine of a flexible fuel vehicle (FFV) at starting the engine for improving starting characteristics.

Various attempts have been made to provide engine control systems enabling the engine to be operated with alcohol mixed fuel because of energy shortage and improvement of emission control these days. Japanese Patent Application Laid-open 64-69768 discloses one of the systems.

The flexible fuel vehicle having such an engine control system can be driven with gasoline only, or mixed fuel of gasoline and alcohol, or alcohol only. Namely, the concentration of the alcohol in the fuel changes between 0% (gasoline only) to 100% (alcohol only) in dependency on user conditions.

Generally, the alcohol has difficulty in vaporization at a lower temperature and has a higher ignition point compared with the gasoline. If the alcohol concentration changes, the starting characteristics vary a lot in accordance with the temperature. In particular, if the alcohol concentration increases, the starting characteristics lower in a cold engine state.

In order to solve such a problem, a heater or a heating element is provided in the engine to heat the fuel for developing the vaporization of the fuel.

Japanese Patent Application Laid-open 57-52665 discloses a system in which an intake pipe of the engine is heated by a heater controlled in accordance with an output signal of an alcohol concentration sensor. When the alcohol concentration is larger than a reference value, the heating quantity of the heater is increased.

Japanese Patent Application Laid-open 55-35179 discloses a system in which a distributor valve is provided for distributing air-fuel mixture to a main intake passage and a sub-intake passage. A heating element is disposed in the sub-intake passage to vaporize the fuel passing in the sub-intake passage at starting the cold engine.

However, when starting the engine, it is necessary not only to heat the fuel, but also to raise the temperature of a combustion chamber of the engine. For this purpose, it is necessary to enrich the fuel mixture after starting the engine, which causes emission control deterioration and increases fuel consumption.

Furthermore, when starting the engine, the residual fuel in a cylinder or an intake manifold will cause unstable initial combustion.

At low temperature, since the alcohol is easily separated from the gasoline, the distribution of alcohol concentration in the fuel mixture in the fuel tank is not constant. Consequently, the alcohol concentration measured by a concentration sensor is inaccurate, reducing the startability of the engine.

In addition, the vaporization of the fuel is dependent on a heater position in the intake passage. If the heater position is improper, the fuel is incompletely vaporized, so that residual fuel which is not ignited adheres to an inner wall of an intake port. As a result, the air-fuel ratio becomes improper to reduce the starting characteristics and increase the fuel consumption.

SUMMARY OF THE INVENTION

An object of the present invention is to provide an engine control method which precisely controls the starting of the engine at a proper air-fuel ratio.

Another object of the present invention is to provide a method by which fuel is effectively vaporized at a cold engine state, thereby easily starting the engine.

The other objects and features of this invention will become understood from the following description with reference to the accompanying drawings.

BRIEF DESCRIPTION OF DRAWINGS

FIG. 31 is a block diagram showing the principle of the heater unit of FIG. 30a;

DETAILED DESCRIPTION OF THE PREFERRED EMBODIMENTS

Figure 1:
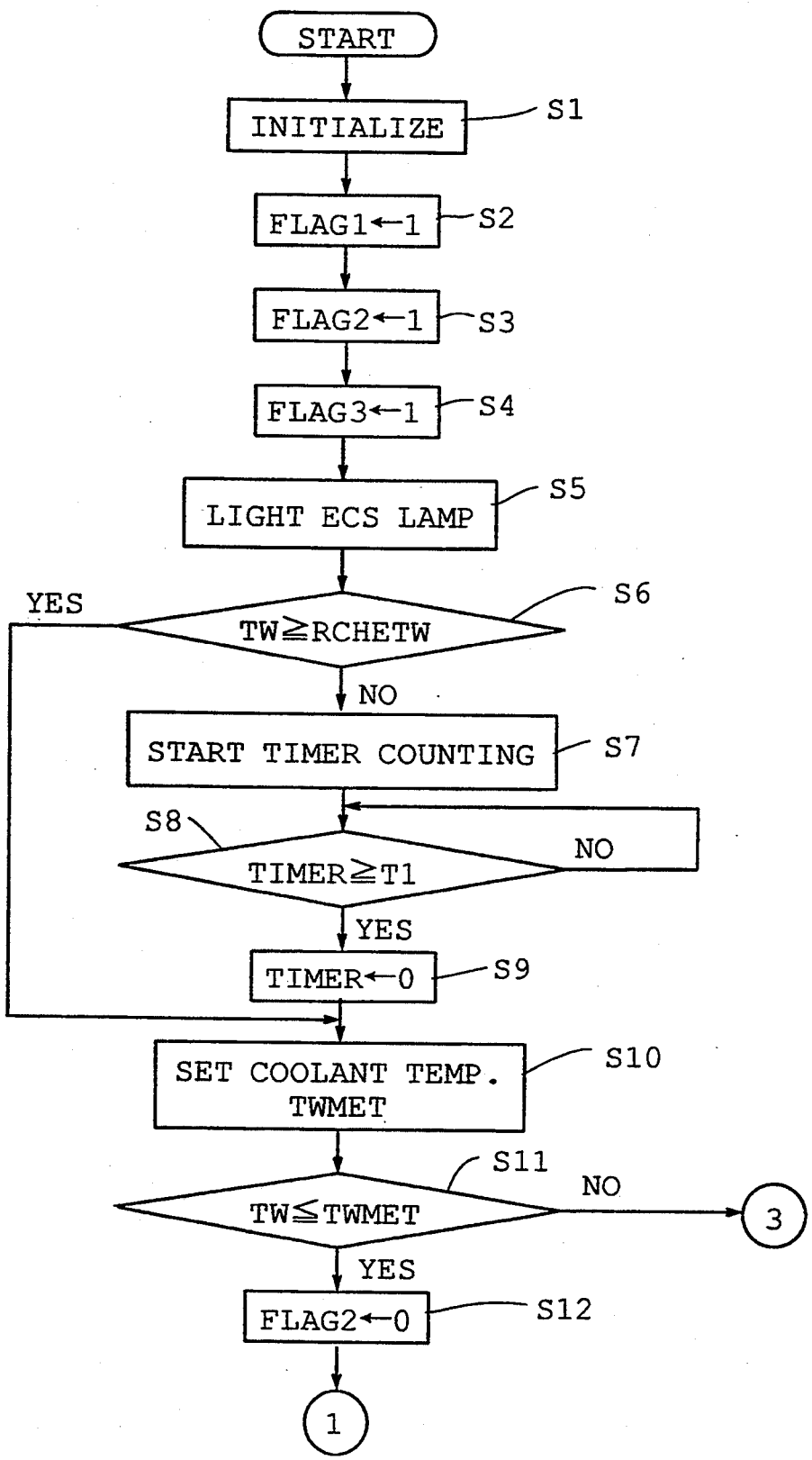
FIGS. 1 to 4 are flowcharts showing a program as a first embodiment of the present invention.
Figure 2:
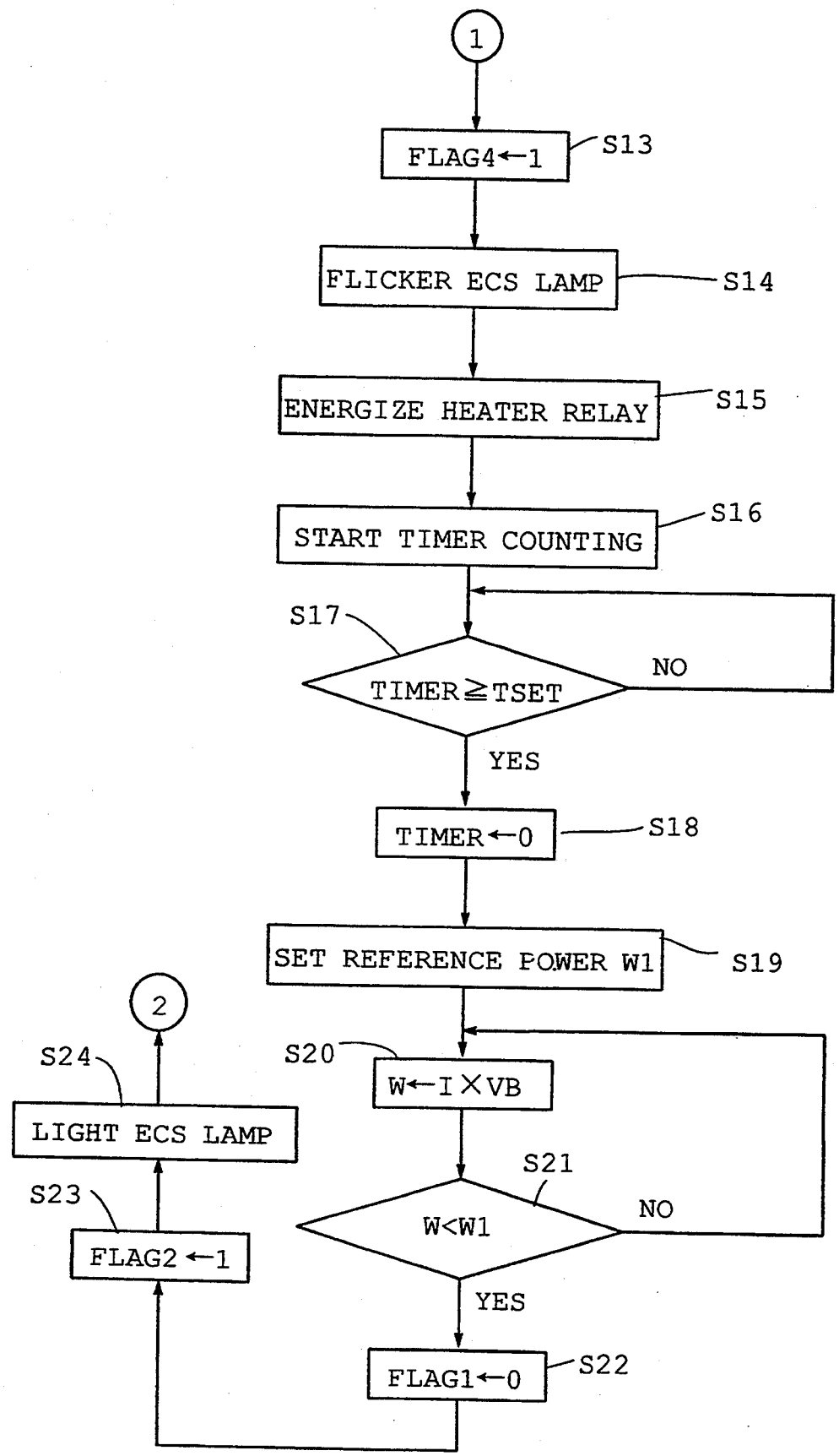
Figure 3:
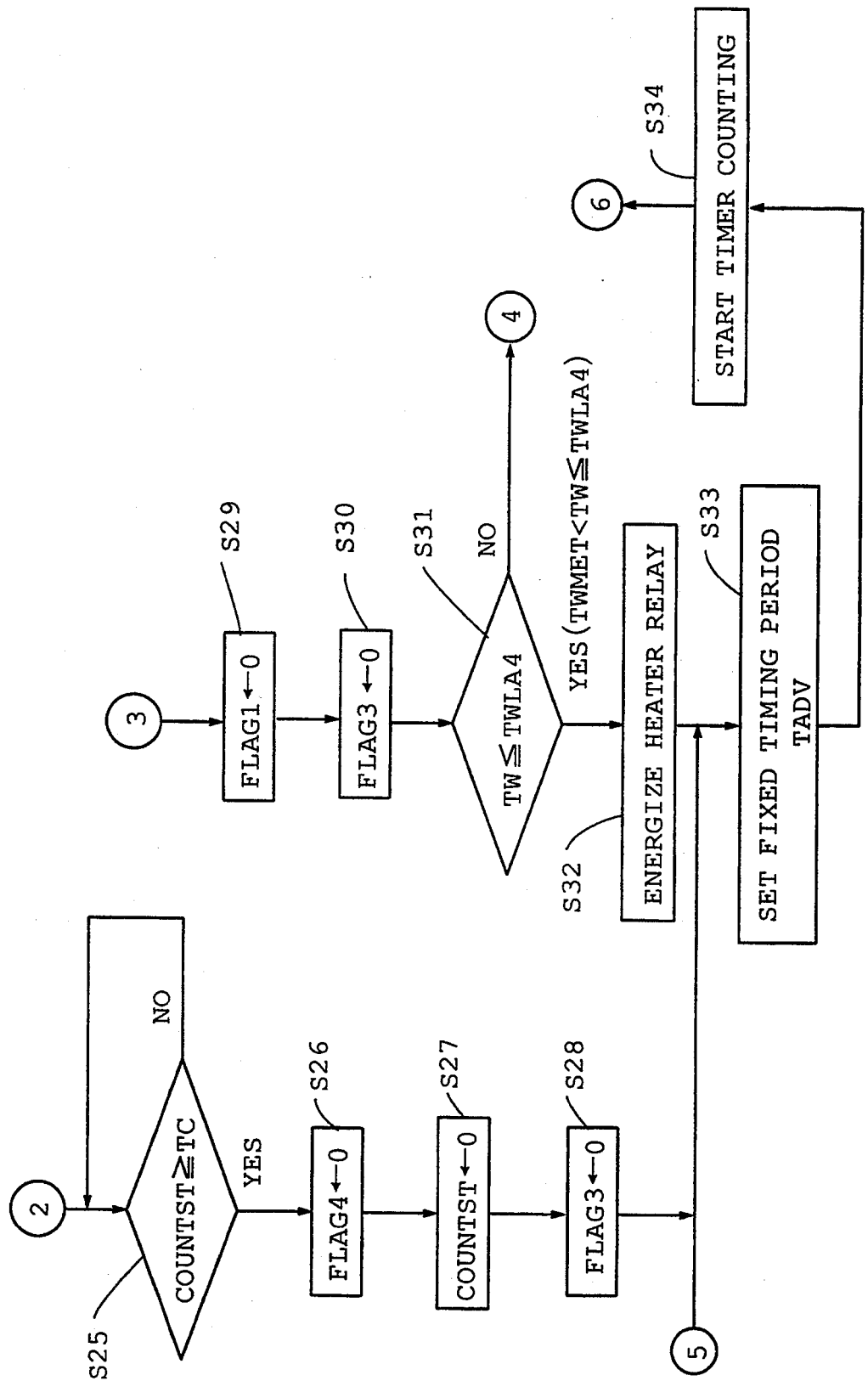
Figure 4:
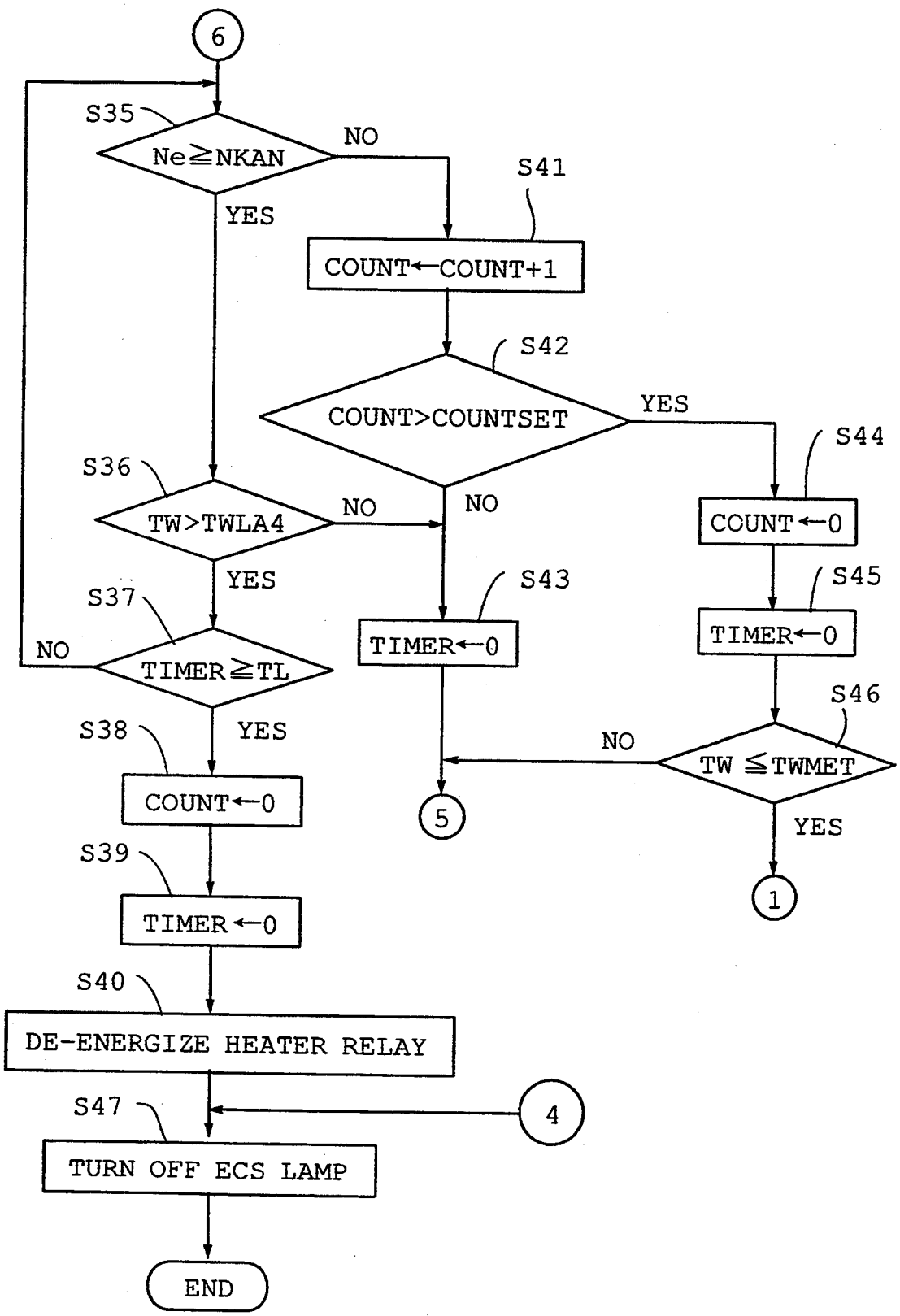
Figure 5:
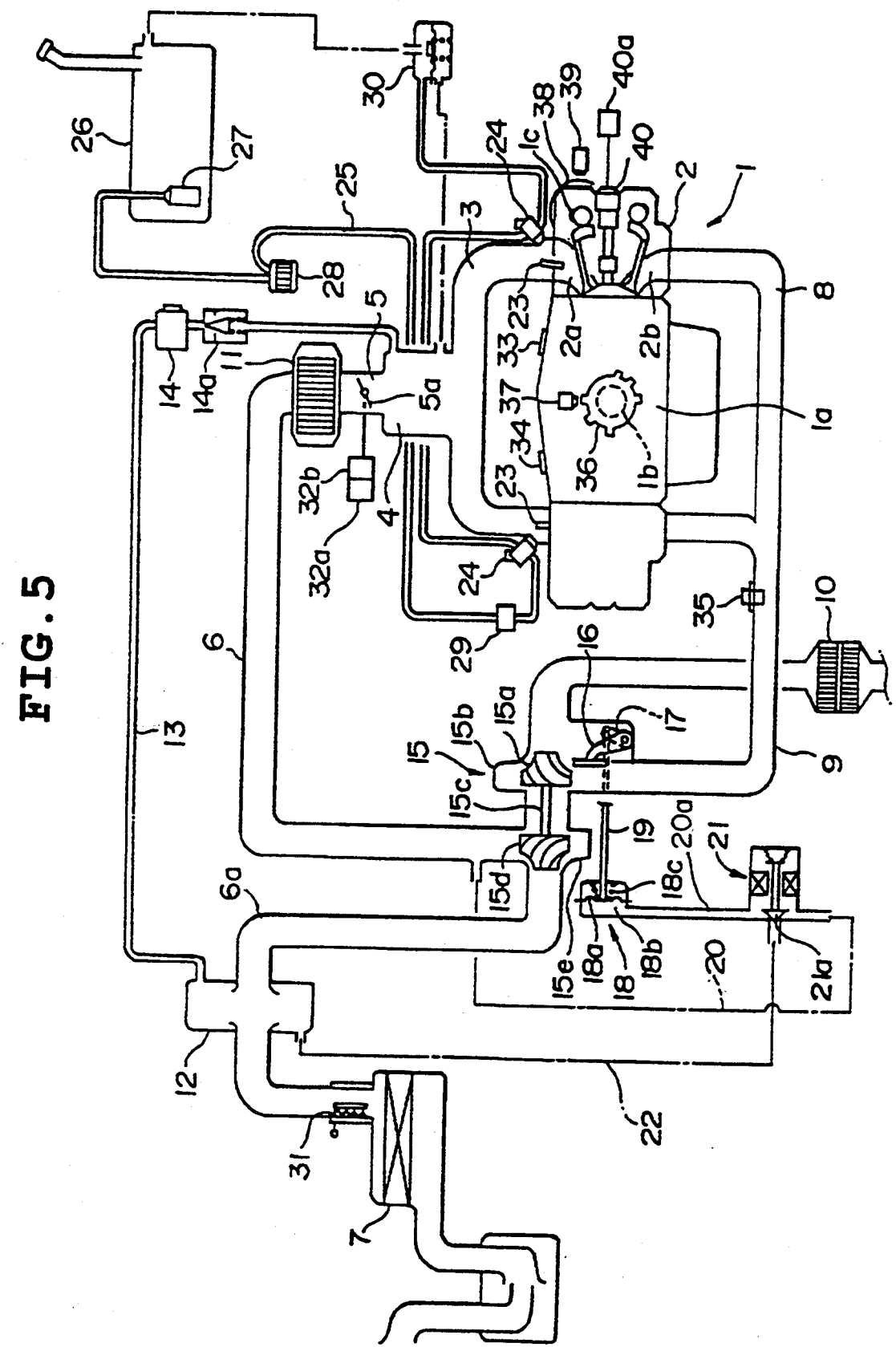
FIG. 5 is a schematic illustration of a system according to the present invention.

Referring to FIG. 5 showing a horizontal opposed type four-cylinder engine 1 to which the present invention is applied, a cylinder head 2 of the engine 1 has intake ports 2a and exhaust ports 2b which are communicated with an intake manifold 3 and an exhaust manifold 8, respectively. A throttle chamber 5 having a throttle valve 5a is communicated with the intake manifold 3 through an air chamber 4. The throttle chamber 5 is communicated with an air cleaner 7 through an intake pipe 6. In the intake pipe 6, an intercooler 11 is provided upstream of the throttle chamber 5, and a resonator chamber 12 is provided downstream of the air cleaner 7.

A bypass 13 having an idle speed control valve (ISCV) 14 is formed around the throttle valve 5a. The bypass 13 is communicated with the air chamber 4 and the resonator chamber 12. A check valve 14a is provided in the bypass 13 downstream of the ISCV 14 to be opened when the intake pressure at the downstream side of the throttle valve 5a is negative. The ISCV 14 is a solenoid operated rotary valve controlled by duty ratio of a control signal. The flow of air passing through the bypass 13 is controlled by the opening degree of the ISCV 14, thereby controlling the engine speed at engine idling. In the system, as the duty ratio increases, the opening degree of the ISCV 14 becomes large.

The exhaust manifold 8 is communicated with an exhaust pipe 9 in which a catalytic converter 10 is mounted.

A turbocharger 15 is provided in the exhaust pipe 9 as a supercharger. The turbocharger 15 includes a turbine 15a having a turbine wheel housed in a housing 15b communicated with the exhaust pipe 9 and a compressor 15d having an impeller housed in a housing 15e communicated with the resonator 12 through the intake pipe 6a. An outlet port of the housing 15e is communicated with cylinders of an engine 1 through the throttle valve 5a, chamber 5 and intake manifold 3. The impeller of the compressor 15d is mounted on a turbine shaft 15c connected to the turbine wheel of the turbine 15a. When the turbine 15a is operated by exhaust gas from the engine 1 through the exhaust manifold 8, the impeller is rotated by the turbine for compressing the intake air. Thus, the compressed intake air is supplied to the engine cylinders.

A wastegate valve 16 which is operated by a diaphragm operated actuator 18 is provided in an inlet port of the housing 15b. A lever 17 of the wastegate valve 16 is operatively connected to a rod 19 of the diaphragm operated actuator 18. The rod 19 is connected to a diaphragm 18a. The diaphragm 18a is urged by a spring 18c to close the wastegate valve 16 through the rod 19 and the lever 17. A chamber 18b of the diaphragm operated actuator 18 is communicated with the intake pipe 6 through a passage 20a, a duty solenoid operated valve 21 and a passage 20 downstream of the compressor 15d.

The duty solenoid operated valve 21 has a solenoid and a valve body 21a. The valve body 21a is disposed to close a drain port of a pressure reducing passage 22 communicated with the resonator 12. Upon energization of the solenoid in response to a duty signal applied from an electronic control unit 41, the valve body 21a is moved to open the drain port communicated with the passage 22. Thus, the intake pressure downstream of the compressor 15d is applied to the chamber 18a of the actuator 18 through the passage 20, valve 21 and passage 20a. The diaphragm 18a is deflected in accordance with the balance of inner pressure of the chamber 18b and the spring force of the spring 18c for operating the wastegate valve 16. The opening area of the inlet port of the housing 15b of the turbine 15a is controlled by the wastegate valve 16 so that a maximum supercharging pressure is controlled.

As the duty ratio of the duty signal is increased, the valve body 21a is operated to increase the opening period of the drain port of the passage 22 per unit hour. Thus, the positive pressure supplied to the chamber 18b is decreased to increase the supercharging pressure for controlling the wastegate valve 16 accordingly. Consequently, the maximum supercharging pressure is increased by the turbocharger 15.

A heater unit 23 is provided in each of the intake ports 2a as a starting auxiliary device. Fuel injectors 24 are mounted in the intake manifold 3 adjacent corresponding ports 2a. A spark plug 40 is located in each combustion chamber formed in the cylinder head 2.

Figure 6:
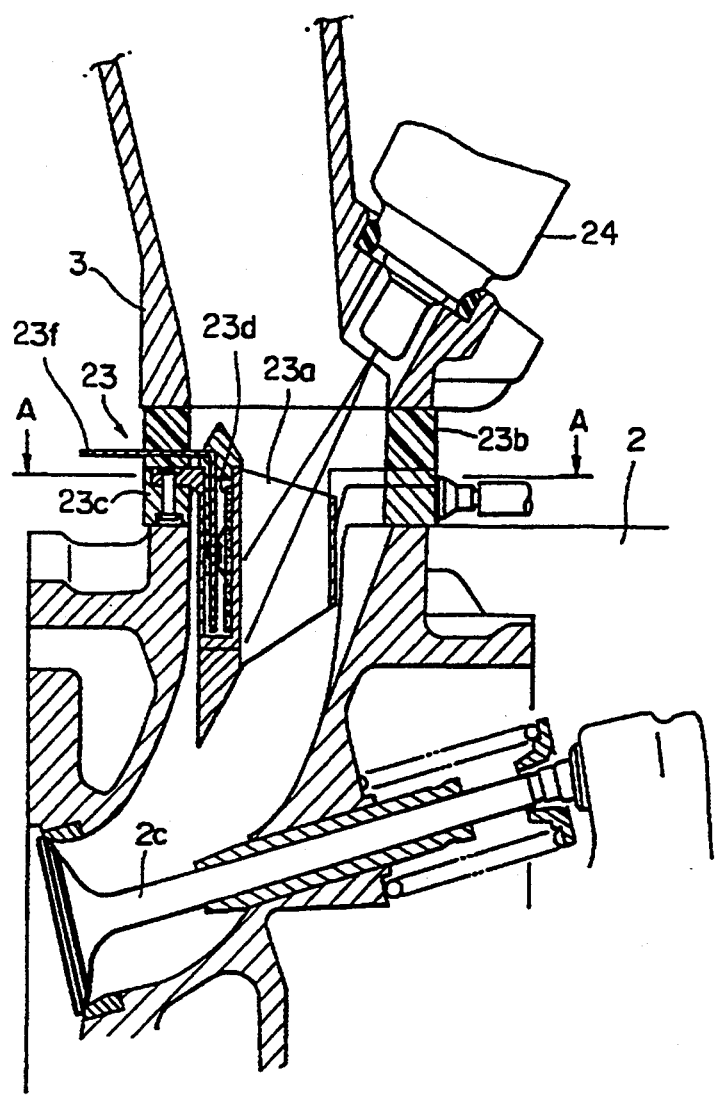
FIG. 6 is a sectional view showing a heater unit.
Figure 7:
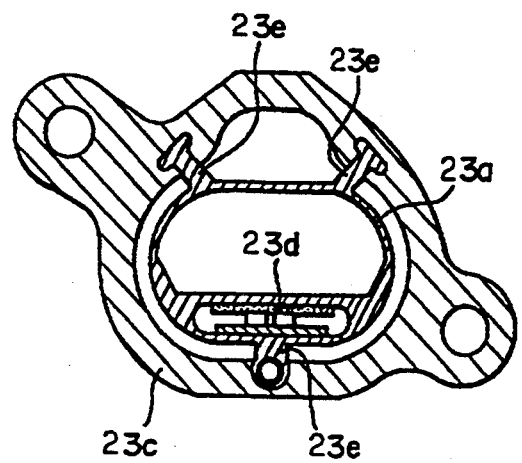
FIG. 7 is a sectional view of the heater unit taken along a line A—A of FIG. 6.

Referring to FIGS. 6 and 7, the heater unit 23 has a flange 23c and an insulator 23b as an attachment. A cylindrical heating element 23a is mounted in the flange 23c through a plurality of stays 23e. A heater 23d comprising a positive temperature coefficient (PTC) pill is provided in the heating element 23a. The flange 23c and the insulator 23b are inserted between the cylinder head 2 and the intake manifold 3 and secured to the cylinder head 2 with bolts (not shown). Thus, the heating element 23a is insulated from the intake manifold 3. The heater 23d is disposed in the heating element 23a corresponding to the injecting direction of fuel from the fuel injector 24.

Figure 8:
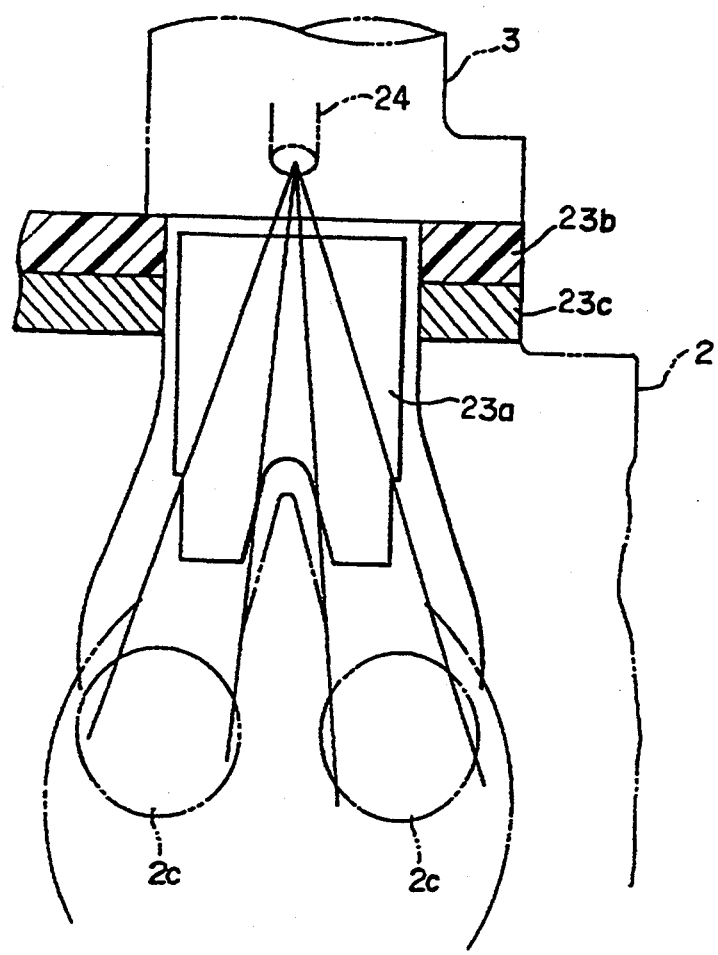
FIG. 8 is a schematic diagram showing fuel injection to an intake port.

When the heater 23d is energized through a terminal 23f, the fuel injected from the injector 24 is vaporized with the heating element 23a and distributed to a pair of intake valves 2c as shown in FIG. 8.

Figure 7A:
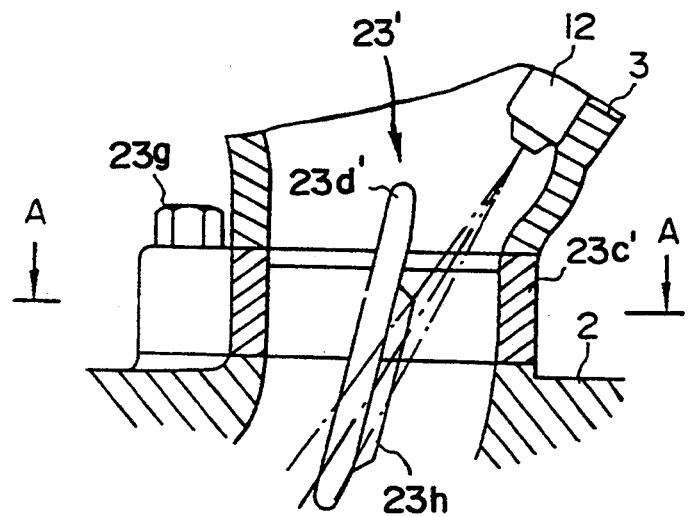
FIGS. 7a and 7b are sectional views showing a modification of the heater unit.
Figure 7B:
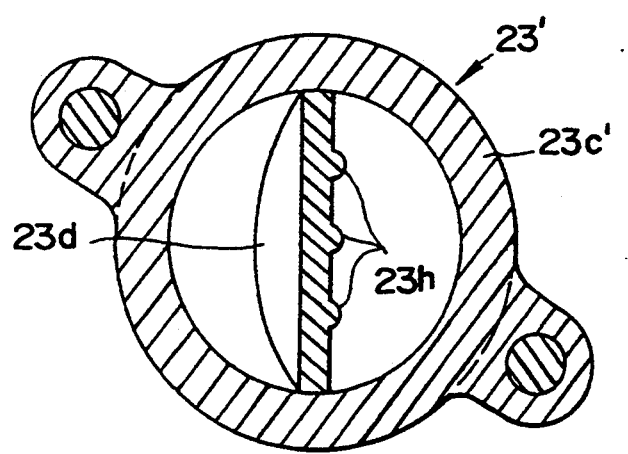

FIGS. 7a and 7b show a modification of the heater unit 23. A heater unit 23' has a flange 23c' and a heater 23d' formed integral with the flange 23c'. The flange 23c' is engaged between the cylinder head 2 and the intake manifold 3 and secured to the cylinder head 2 with bolts 23g. The heater 23d' comprises a positive temperature coefficient (PTC) pill having a disk shape. The heater has fins 23h formed on the surface thereof corresponding to the injecting direction of the fuel injector 24. The heater 23d' is mounted in an inclined position in the flange 23c' so as not to obstruct the flow of the intake air. The fuel is injected from the fuel injector 24 to the entire surface of the heater 23. The fins 23h are provided for preventing the fuel from spreading.

The fuel in a fuel tank 26 is supplied to the injector 24 passing through a fuel passage 25. In the tank 26, mixed fuel of gasoline and alcohol at an alcohol concentration between 0% to 100% is stored.

A fuel pump 27 is provided in the tank 26. The fuel in the tank is supplied to the injectors 24 by the pump 27 through the passage 25 having a filter 28 and an alcohol concentration sensor 29, and returned to the tank 26 through a pressure regulator 30. The fuel pressure is regulated to a predetermined value by the pressure regulator 30.

The alcohol concentration sensor 29 comprises a pair of electrodes for detecting current based on electric conductivity of fuel. Other types of the sensor such as a resistance detecting type, electrostatic capacity type and optical type can be used.

An intake air quantity sensor 31 of a hot wire type air-flow meter is provided in the intake pipe 6 downstream of the air cleaner 7. A throttle position sensor 32a is provided for detecting an opening degree of the throttle valve 5a. An idle switch 32b is provided adjacent the throttle position sensor 32a for detecting the throttle valve 5a at an idling position.

In order to detect knocking, a knock sensor 33 is mounted on a body 1a of the engine 1 to detect oscillation of the engine 1. A coolant temperature sensor 34 is provided in a coolant jacket (not shown) of the engine 1 and an $O_2$-sensor 35 is provided in the exhaust pipe 9.

A crankshaft disk 36 is secured to a crankshaft 1b of the engine 1. A crank angle sensor 37 (magnetic pickup) is provided adjacent the crankshaft disk 36 for detecting crank angles.

A camshaft disk 38 is secured to a camshaft 1c for detecting camshaft angles. A cam angle sensor 39 is provided adjacent the camshaft disk 38.

Figure 9:
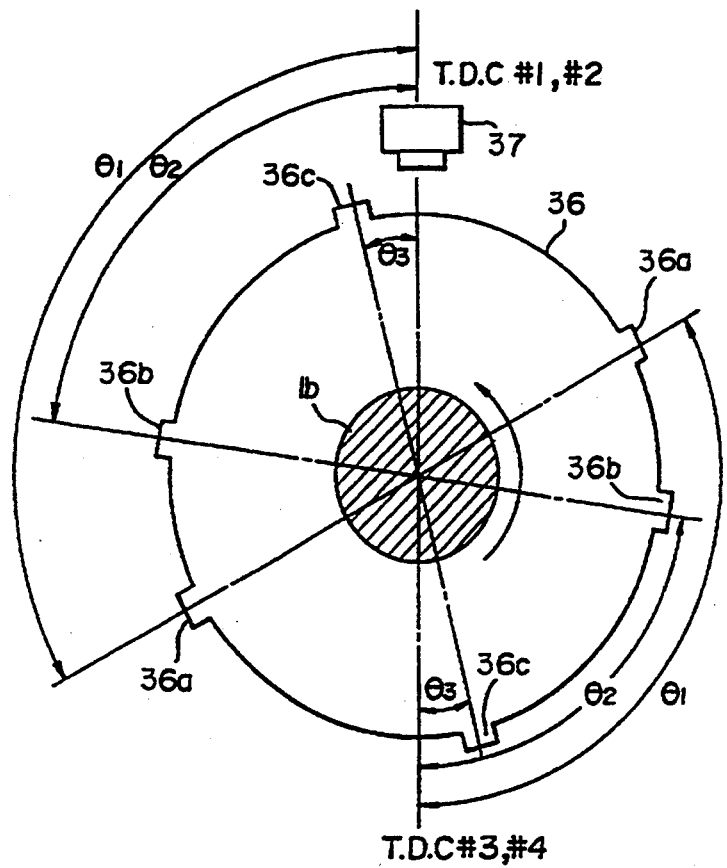
FIG. 9 shows a crankshaft disk with a crank angle sensor provided in the system.

Referring to FIG. 9, cylinders of the engine 1 are divided into two groups. A first group consists of No.1 and No.2 cylinders, and a second group consists of No.3 and No.4 cylinders. Top dead centers of two cylinders in each group have same timing. The crankshaft disk 36 has a pair of projections 36a disposed at a crank angle $\Theta 1$ before the top dead center (BTDC), a pair of projections 36d disposed at a crank angle $\Theta 2$ (BTDC), and a pair of projections 36c disposed at a crank angle $\Theta 3$ (BTDC). A rotating period of the engine 1 is calculated from an elapsed time between the projections 36a and 36b. The crank angle $\Theta 1$ of the projection 36a represents a reference crank angle for determining an ignition timing and a fuel injection timing. The crank angle $\Theta 3$ of the projection 36c represents a reference crank angle for determining a fixed ignition timing.

When the crankshaft disk 36 rotates, the crank angle sensor 37 detects positions of the projections 36a, 36b and 36c and produces signals in the form of pulses.

Figure 10:
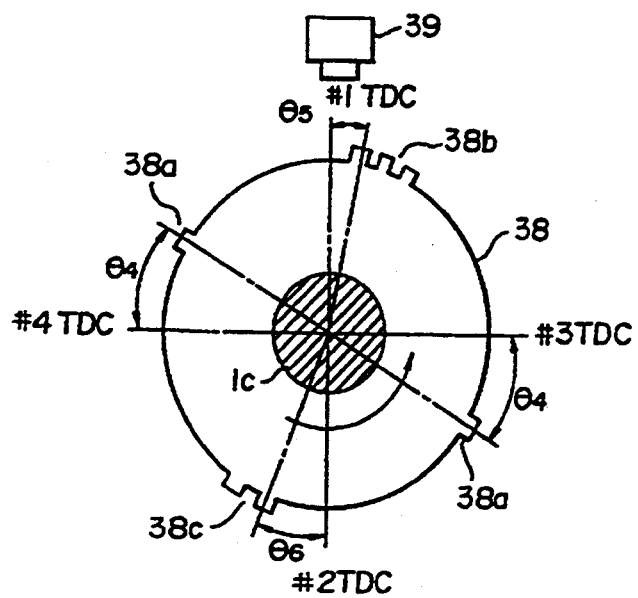
FIG. 10 shows a camshaft disk having a cam angle sensor provided in the system.

Referring to FIG. 10, the camshaft disk 38 is provided with a projection 38a, a pair of projections 38c, a projection 38a, and three projection 38b on an outer periphery thereof. Projections are positioned according to firing (igniting) order of the cylinder. Namely, the projections 38a represent No.3 and No.4 cylinders, disposed at a cam shaft angle $\Theta 4$ after the top dead center (ATDC) in the compression stroke, the projections 38b represent No.1 cylinder and the first projection is disposed at a cam angle ATDC $\Theta 5$, and the projections 38c represent No.2 cylinder and the first projection is disposed at a cam angle ATDC $\Theta 6$. The cam angle sensor 39 detects the projections to produce a cam angle signal representing the number of the cylinder in the form of the pulses.

In the system, the angle $\Theta 1$ is 97° CA, angle $\Theta 2$ is 65° CA, $\Theta 3$ is 10° CA, $\Theta 4$ is 20° CA, $\Theta 5$ is 5° CA, $\Theta 6$ is 2° CA.

As crank and cam angle sensors, an optical sensor can be used in place of the magnetic pickup.

Figure 11:
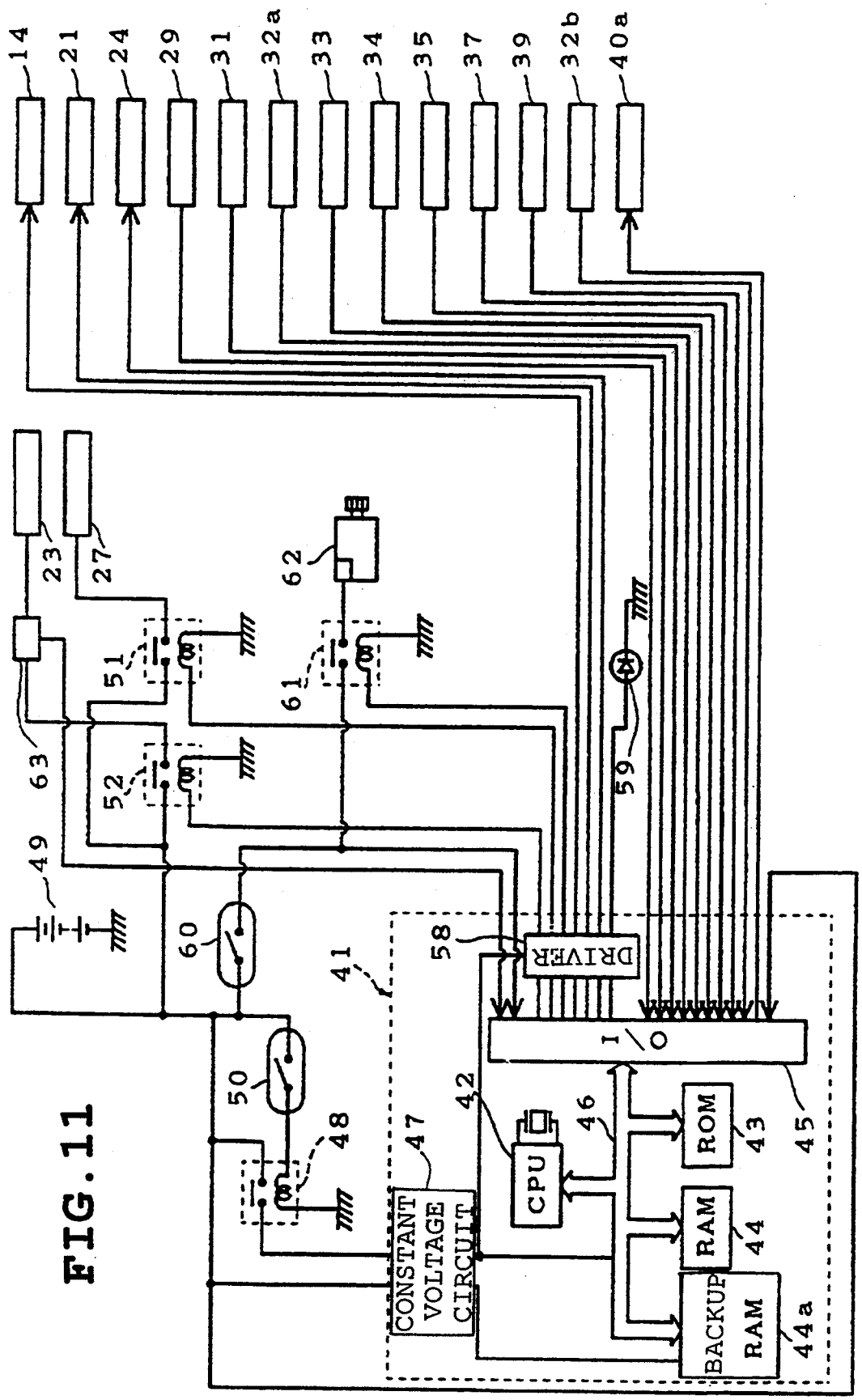
FIG. 11 shows a circuit of an electronic control unit.

Referring to FIG. 11, the electronic control unit 41 having a microcomputer comprises a CPU (central processing unit) 42, a ROM 43, a RAM 44, a backup RAM 44a and an input/output interface 45, which are connected to each other through a bus line 46. A constant voltage circuit 47 is connected to each element of the control unit 41 for supplying a predetermined constant voltage. Power is applied from a battery 49 to the constant voltage circuit 47 through a contact of a relay 48.

The battery 49 is connected to a coil of the relay 48 through an ignition switch 50, to a starter motor 62 through a starter switch 60 and the contact of a relay 61, to the fuel pump 27 through the contact of a relay 51, and to the heater unit 23 through the contact of a relay 52 and a current sensor 63, respectively. Sensors 29, 31, 32a, 33, 34, 35, 37, 39, 63 and the idle switch 32b and the starter switch 60 are connected to an input port of the input/output interface 45. The battery 49 is also connected to the input port for monitoring the voltage of the battery 49. An output port of the I/O interface 45 is connected to the spark plug 40 of the corresponding cylinders through an ignitor 40a and a driver 58 which is connected to the ISCV 14, the duty solenoid valve 21, the injectors 24, each coil of the relays 51, 52, 61 and an ECS lamp 59 for indicating an abnormality or a conductive state of the heater unit 23.

Control programs and fixed data such as an ignition timing map are stored in the ROM 43. Output signals of the sensors and switches are stored in the RAM 44. The RAM 44 stores the output signals of the sensors and the switches after processing data in the CPU 42. The backup RAM 44a is provided to store trouble data. The RAM 44a is backed up by the battery 49 so as to maintain the stored data even if the ignition switch 50 is in off-state.

The CPU 42 calculates a fuel injection pulse width, an ignition timing and the duty ratio of the control signal for controlling the duty solenoid operated valve 21 in accordance with the control programs in the ROM 43 and based on various data in the RAM 44. The corresponding signals are fed to the injectors 24, the ignitors 40a and the duty solenoid valve 21 for controlling the air-fuel ratio, ignition timing, and the maximum supercharging pressure by the turbocharger 15, respectively.

OPERATION (Start Control)

Referring to FIGS. 1 to 4 showing the program of the first embodiment, the program is initialized at a step S1 to turn off relays such as the starter motor relay 61, and the heater relay 52, to reset a timer, and to clear counters and flags. At a step S2, a starter current inhibitor flag FLAG 1 is set to inhibit starter current from flowing to the starter 62, and then a fuel pump current supply flag FLAG 2 is set to supply a current to the fuel pump 27, at a step S3. At a step S4, a fuel injection inhibitor flag FLAG 3 is set to inhibit fuel injection, and then the ECS lamp 59 is lighted at a step S5, and it is determined whether the coolant temperature TW as engine temperature from the coolant sensor 34 is higher than a set value RCHETW at a step S6. When TW≧RCHETW, the program proceeds to a step S10. When TW<RCHETW, it goes to a step S7 where counting by the timer is started. When the time by the timer reaches a set time T1 at a step S8, the timer is cleared at a step S9.

Namely, when the engine temperature is lower than the set value RCHETW, the alcohol mixed fuel is sufficiently and homogeneously mixed by circulating by the fuel pump 27 passing through the pressure regulator 30 and fuel tank 26 for a set time of the timer so as to improve the starting characteristic. The set time is determined from the amount of fuel in the passage between the alcohol concentration sensor 29 and the fuel injector 24, and from the discharge volume of the fuel pump 27.

At a step S10, a start-enabling coolant temperature TWMET is set by referring a start-enabling coolant temperature map MPTW in accordance with the alcohol concentration M as a parameter, with interpolation if necessary. At a step S11, the coolant temperature TW is compared with the reference temperature TWMET.

Figure 12:
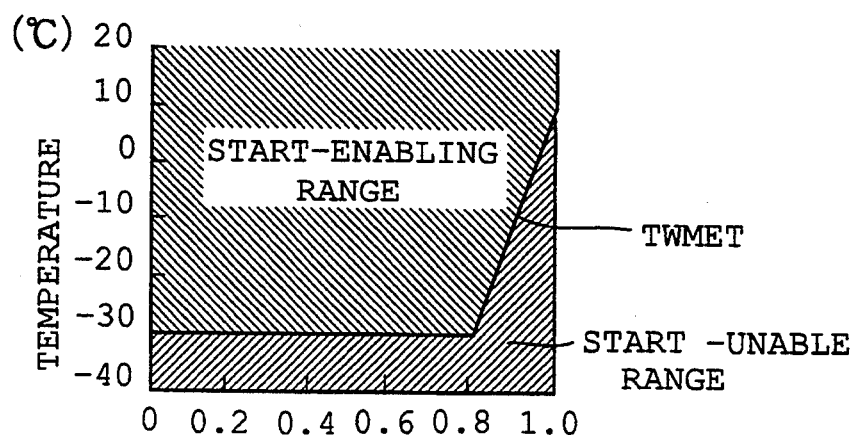
FIG. 12 is a graph showing a start-enabling range and a start-unable range.

FIG. 12 shows a start-enabling range which provides an alcohol concentration M and the temperature for the concentration, at which the engine can be started without heating the fuel with the heater 23d, and a start-unable range.

Figure 13:
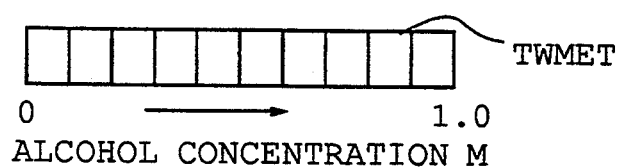
FIG. 13 is a start-enabling coolant temperature map.

FIG. 13 shows the start-enabling coolant temperature map MPTW which is made based on the graph of FIG. 12. By comparing the coolant temperature TW with the start-enabling coolant temperature TWMET, it is determined whether the engine can be started.

When TW≦TWMET, it is determined that the engine is in a start-unable condition, and the program goes to a step S12. At the step S12, the fuel pump current supply flag FLAG 2 is cleared to stop the pump 27. At a step S13, a start-unable control flag FLAG 4 is set, and at a step S14, the lighting of the ECS lamp 59 is changed to flickering, thereby indicating that the heater 23d is excited to heat the fuel. Accordingly, the heater relay 52 is energized at a step S15 to operate the heater 23d, and the timer starts counting at a step S16.

When timer count TIMER becomes larger than a set count TSET (for example 3 sec.) at a step S17, the timer is cleared (step S18). At a step S19, a reference heating electric power W1 is retrieved from a heating power map MPHW in accordance with the coolant temperature TW and the alcohol concentration M. At a step S20, heater power W is calculated from current I detected by the current sensor 63 and battery voltage VB, which is compared with the reference heating power W1 at a step S21.

Figure 14:
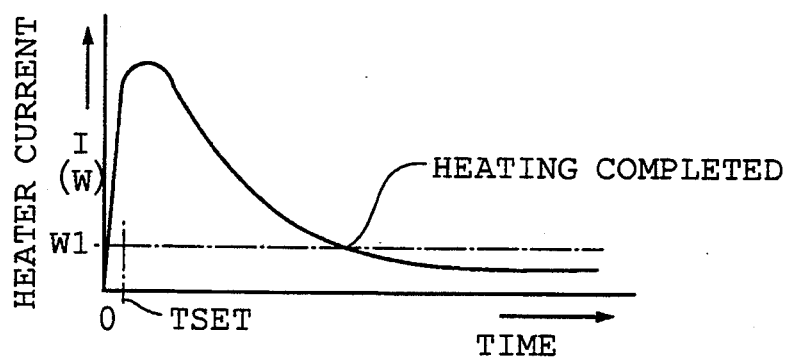
FIG. 14 is a graph showing a heater characteristic.

As shown in FIG. 14, the current I flowing in the heater 23d or 23d' comprising the PTC pill reduces when the current reaches a Curie point, so that heated condition can not be determined by the consumed power. Therefore, the heated condition is determined after a set time TSET.

Figure 15:
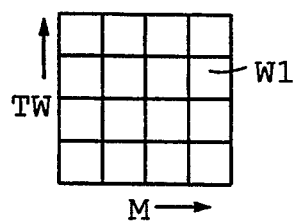
FIG. 15 is a heating power map.

The reference heating power W1 is power consumed for raising the temperature of the heater 23d to a value sufficient for developing the vaporization. FIG. 15 shows the heating power map MPHW in which a plurality of powers are stored in accordance with the coolant temperature TW and the alcohol concentration M. The reference heating power W1 becomes smaller as the alcohol concentration M increases and the coolant temperature lowers in order to sufficiently heat the heater 23d. Consequently, when W<W1, the heating is completed and the program proceeds to a step S22 where the starter current inhibitor flag FLAG 1 is cleared to allow the current to pass to the starter motor 62. At a step S23, the fuel pump current allowable flag FLAG 2 is set to operate the fuel pump 27 again, so that the condition of the ECS lamp 59 changes from flickering to lighting at a step S24.

At a step S25, until a count COUNTST of a counter (for cranking time as described later) reaches a set count TC (for example 2 to 3 sec.), the starter motor 62 is operated without injecting fuel because the fuel injection inhibitor flag FLAG 3 is set, which is called motoring of the engine. By the motoring of the engine, the temperature of the combustion chambers of the engine is increased. Consequently, the vaporization of fuel is enhanced when a fuel mixture is supplied to the chamber, so that the fuel mixture is easily ignited, thereby shortening the warmup time of the engine.

When COUNTST≧TC at the step S25, the start-unable control flag FLAG 4, count COUNTST, and fuel injection inhibitor flag FLAG 3 are cleared at steps S26, S27 and S28, respectively. Thus, the program for the start-unable condition process is completed and proceeds to a step S33.

On the other hand, when TW>TWMET at the step S11, it is determined that the engine is in a start-enabling condition, the program goes to a step S29 for carrying out the start-enabling condition process. At the step S29, the starter current inhibitor flag FLAG 1 is cleared to allow the current to flow in the starter motor. The fuel injection inhibitor flag FLAG 3 is cleared at a step S30, and thereafter it is determined whether the coolant temperature TW reaches a warmup completion temperature (hot engine temperature) TWLA4, for example 50° to 60° C. at a step S31.

When TW>TWLA4, the program proceeds to a step S47 where the ECS lamp 59 is turned off and the program ends. When TW≦TWLA4, the program goes to a step S32, where the heater relay 52 is energized to operate the heater 23d.

The program from the step S28 for the start unable condition process is also processed at the step S33. At the step S33, a fixed timing period TADV is provided from a fixed timing period map MPIGST in accordance with the coolant temperature TW. During the fixed timing period TADV, the ignition timing of the engine is fixed to a particular timing for retarding the ignition timing.

Figure 16:
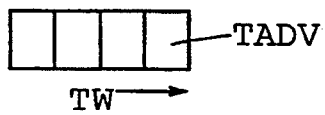
FIG. 16 is a fixed timing period map.

FIG. 16 shows the fixed timing period map MPIGST in which a plurality of fixed ignition timings are stored. The period TADV increases as the coolant temperature lowers. The ignition timing is, for example, fixed to the Θ3 crank pulse input timing from the crank angle sensor 37.

Thus, the ignition timing is retarded in accordance with the engine temperature, so that the fuel mixture can be reliably ignited, thereby improving the starting characteristic.

At a step S34, the timer starts to count, and at a step S35, it is determined whether the engine speed Ne reaches a predetermined speed NKAN which represents that the engine is completely started. When Ne<NKAN, the program proceeds to a step S41 where the counter is counted up (COUNT←COUNT+1). It is determined whether the count exceeds a set count COUNTSET at a step S42.

When COUNT≦COUNTSET, the timer is cleared at a step S43, and then the program returns to the step S33 to repeat the program. When COUNT>COUNTSET, which means that the engine stalls, the program goes to a step S44 where the counted value COUNT is cleared. The timer is cleared at a step S45, and it is determined whether the coolant temperature TW reaches the start-enabling coolant temperature TWMET at a step S46.

When TW>TWMET, the program returns to the step S33. When TW≦TWMET, the program returns to the step S13 for the start-unable condition control.

On the other hand, when Ne≧NKAN at the step S35, which means that the engine 1 is completely started, the program proceeds to a step S36, where it is determined whether the coolant temperature TW reaches the warmup temperature TWLA4. When TW≦TWLA4, the program goes to the step S43, at which the timer is cleared and returns to the step S33. When TW>TWLA4, it is determined that timer measuring time TIMER reaches a set time TL at a step S37. Namely, the completion of the engine warmup is determined at the step S37 after starting the engine 1. At a step S38, the counted value COUNT is cleared, and the timer is cleared at a step S39. At a step S40, the heater relay 52 is de-energized to cut off the current to the heater 23d, and the ECS lamp 59 is turned off at the step S47. Hence the program ends.

In other words, during the engine warmup, the fuel from the fuel injector 24 is vaporized by the heater 23d, thereby improving starting characteristics and warming-up operation to reduce warming-up period and fuel consumption.

(Starter Motor Control)

The above-described program at starting the engine 1 is interrupted at a predetermined interval to execute a program for controlling the starter motor.

Figure 17:
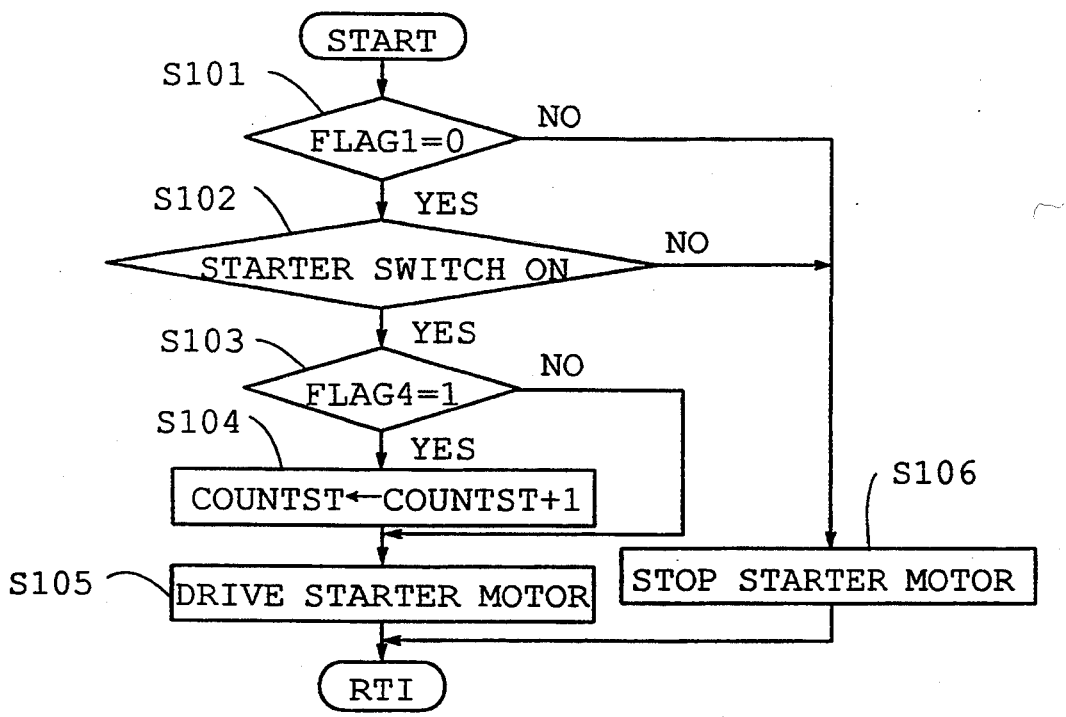
FIG. 17 is a flowchart describing a starter motor control operation.

Referring to FIG. 17, at a step S101, it is determined whether the starter current inhibitor flag FLAG 1 is set. When the flag FLAG 1 is reset, the program goes to a step S102 to determine whether the starter switch 60 is turned on. If the starter switch 60 is on, the program further proceeds to a step S103 to determine the state of the start-unable control flag FLAG 4. If the flag FLAG 4 is set, which means that the coolant temperature TW is lower than the start-enabling coolant temperature TWMET, the engine cannot be started. Hence, the program goes to a step S104 to count up the count COUNTST of the cranking time to the set count TC described hereinbefore. Thereafter, the starter motor relay 61 is energized to drive the starter motor 62 at a step S105, so that the crankshaft of the engine 1 is rotated without the fuel (motoring). When the start-unable control flag FLAG 4 is reset, the program jumps from the step S103 to the step S105 without counting up the count COUNTST.

On the other hand, when the starter current inhibitor flag FLAG 1 is set, or the starter switch 60 is turned off, the program goes from the steps S101 and S102 to a step S106 where the starter motor relay 61 is de-energized to stop the starter motor 62.

(Cylinder Discrimination, Engine Speed Calculation)

Figure 18:
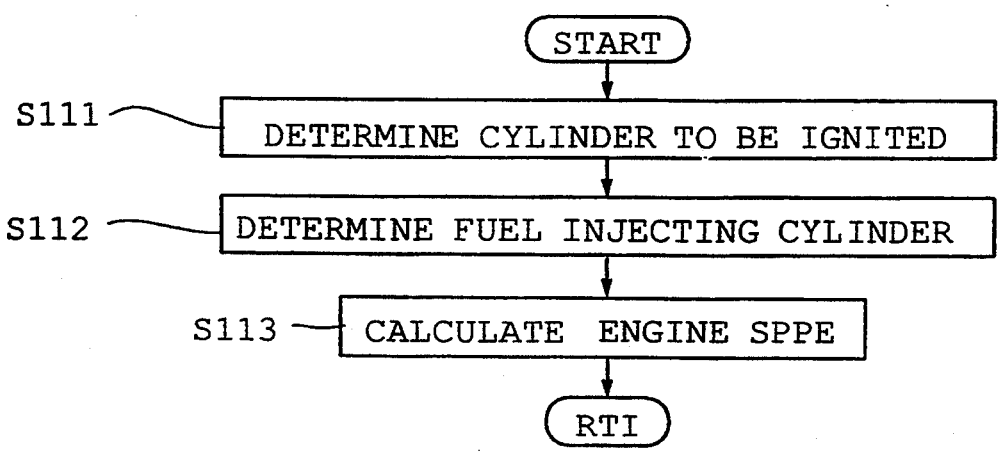
FIG. 18 is a flowchart describing a cylinder discrimination and engine speed, calculation operation.

FIG. 18 shows a program for determining the cylinder to be started and for calculating the engine speed in accordance with crank pulse signals and cam pulse signals. In the four-cylinder engine in the embodiment, the ignitions and fuel injections are carried out successively from No.1, No.3, No.2 to No.4 cylinders. The fuel is sequentially injected to each cylinder at every 720° CA (two crankshaft rotations).

Figure 29:
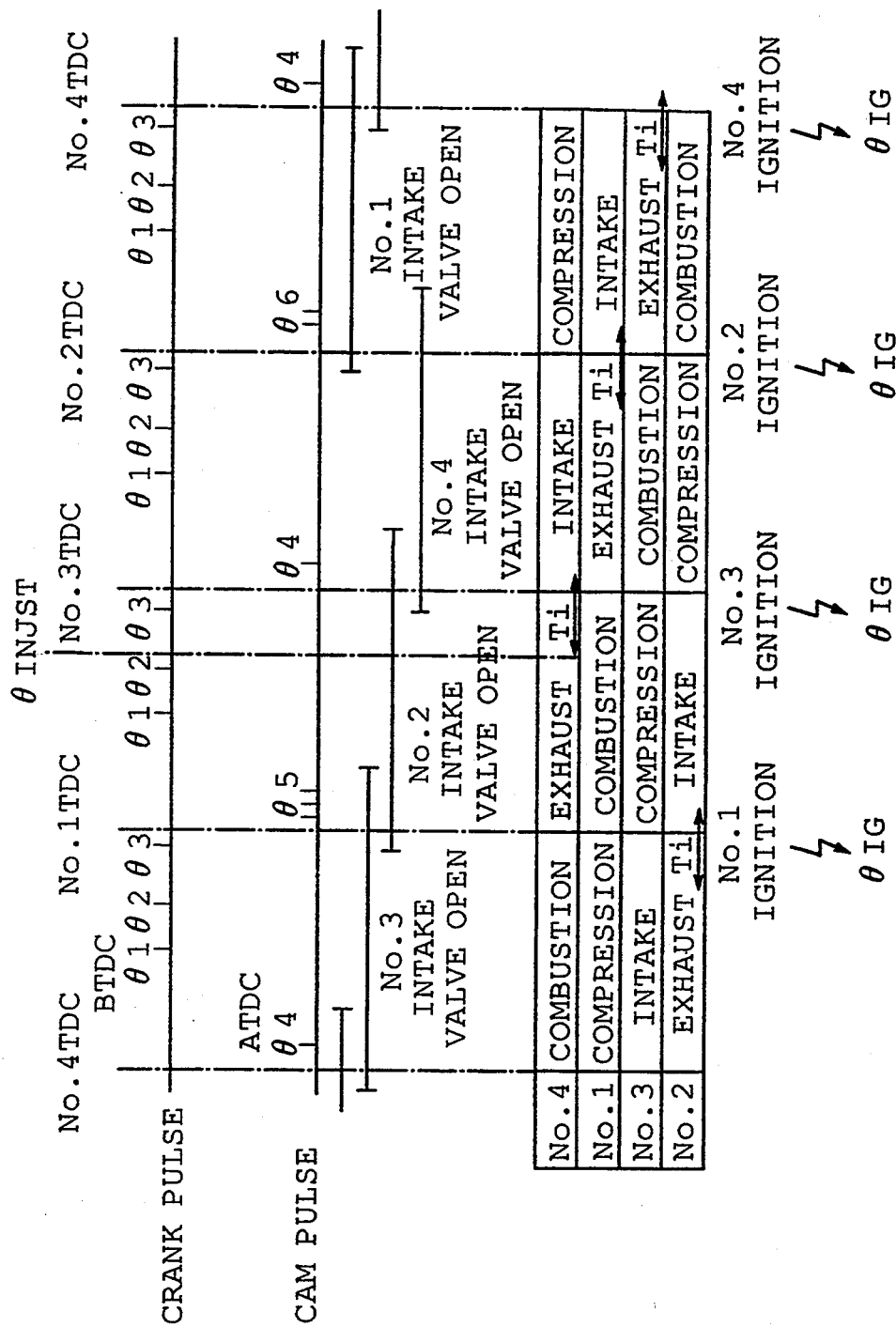
FIG. 29 is a timechart showing the ignition and fuel injection timings in each cylinder of the engine.

As shown in the timechart of FIG. 29, when the cam angle sensor 39 detects the position of the projection 38b at angle Θ5 it is determined that a crank angle pulse signal produced by the crank angle sensor 37 after the cam angle pulse signal of the angle Θ5 represents the top dead center of No. 3 cylinder. Hence, the next ignition timing is for the No.3 cylinder and the next fuel injection is for the cylinder No.4 which is two cylinders after the No.3 cylinder in order. When the cam angle sensor 39 detects the projection 38a at angle Θ4, it is determined that a crank pulse signal produced after the cam signal Θ4 represents the top dead center of No.2 cylinder. Thus, the No.2 cylinder is the next igniting cylinder and No.1 cylinder is the next fuel injecting cylinder.

Similarly, the crank pulse signal produced after the cam pulse signal of the projection 38c at angle Θ6 represents No.4 cylinder and the crank pulse signal produced after the cam pulse signal of the projection 38a at angle Θ4 represents No.1 cylinder. Thus the No.1 cylinder is the next ignition cylinder and No.2 cylinder is the next fuel injecting cylinder.

Futhermore, the crank pulse signal produced by the crank angle sensor 37 after the cam pulse signal from the cam angle sensor 39 represents a basic crank angle Θ1 of the corresponding cylinder.

Accordingly, at a step S111, the igniting cylinder No.i is determined in accordance with the cam pulse signal from the cam angle sensor 39 and at a step S112, the fuel injecting cylinder No.(i+2) is determined.

Thereafter, at a step S113, an engine speed Ne is calculated in dependency on the crank pulse signals from the crank angle sensor 37. The time interval between the crank pulse signals, for example the interval between crank angles BTDC Θ1 and Θ2 is measured, thereby to obtain a cycle f, and hence the engine speed Ne is calculated in accordance with $$Ne = 60/f$$

The engine speed Ne is stored at a predetermined address of the RAM 44.

(Fuel Injection Quantity, Ignition Timing)

Figure 19:
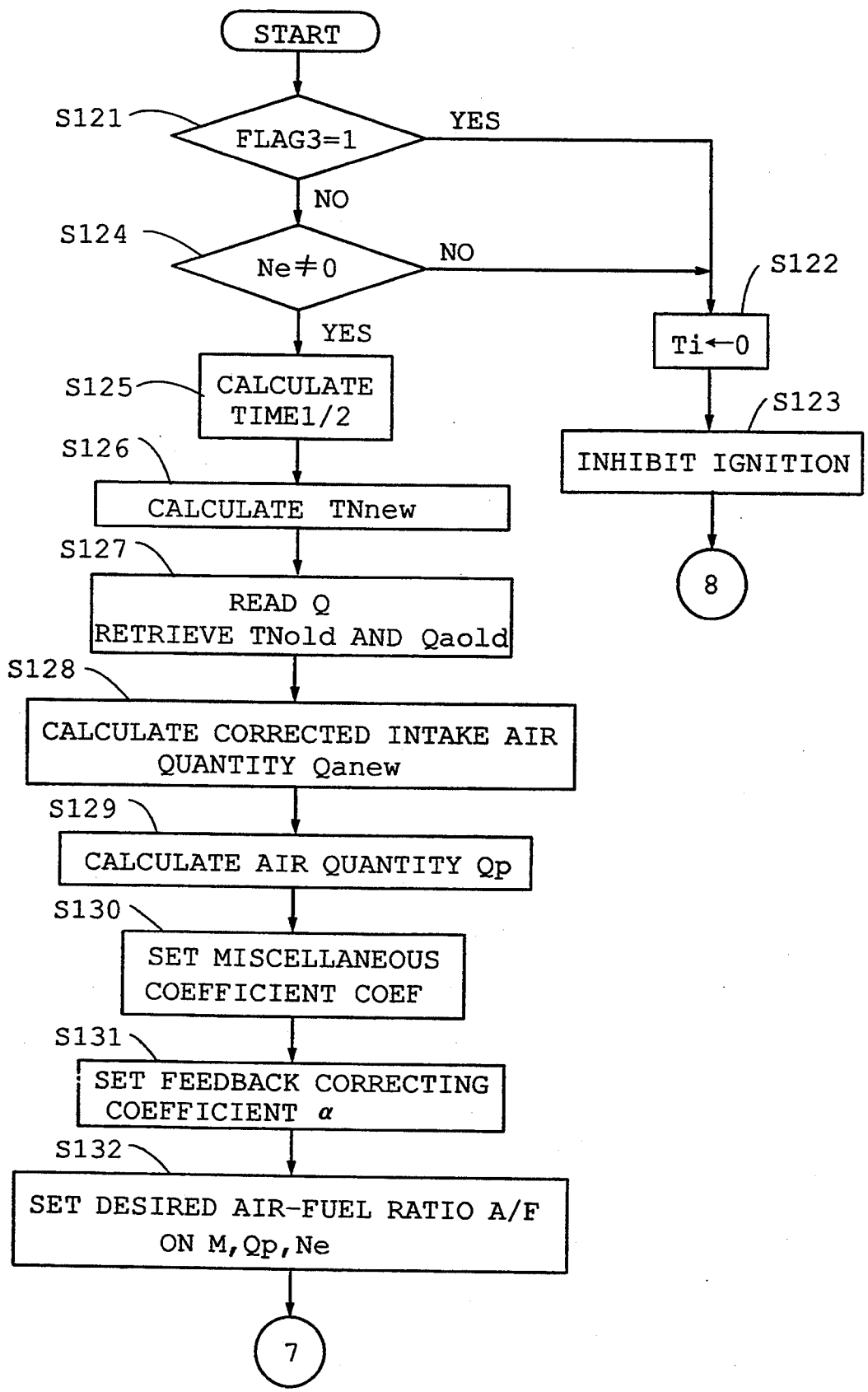
FIGS. 19 to 21 show a flowchart describing a fuel injection quantity and ignition timing determining operation.
Figure 20:
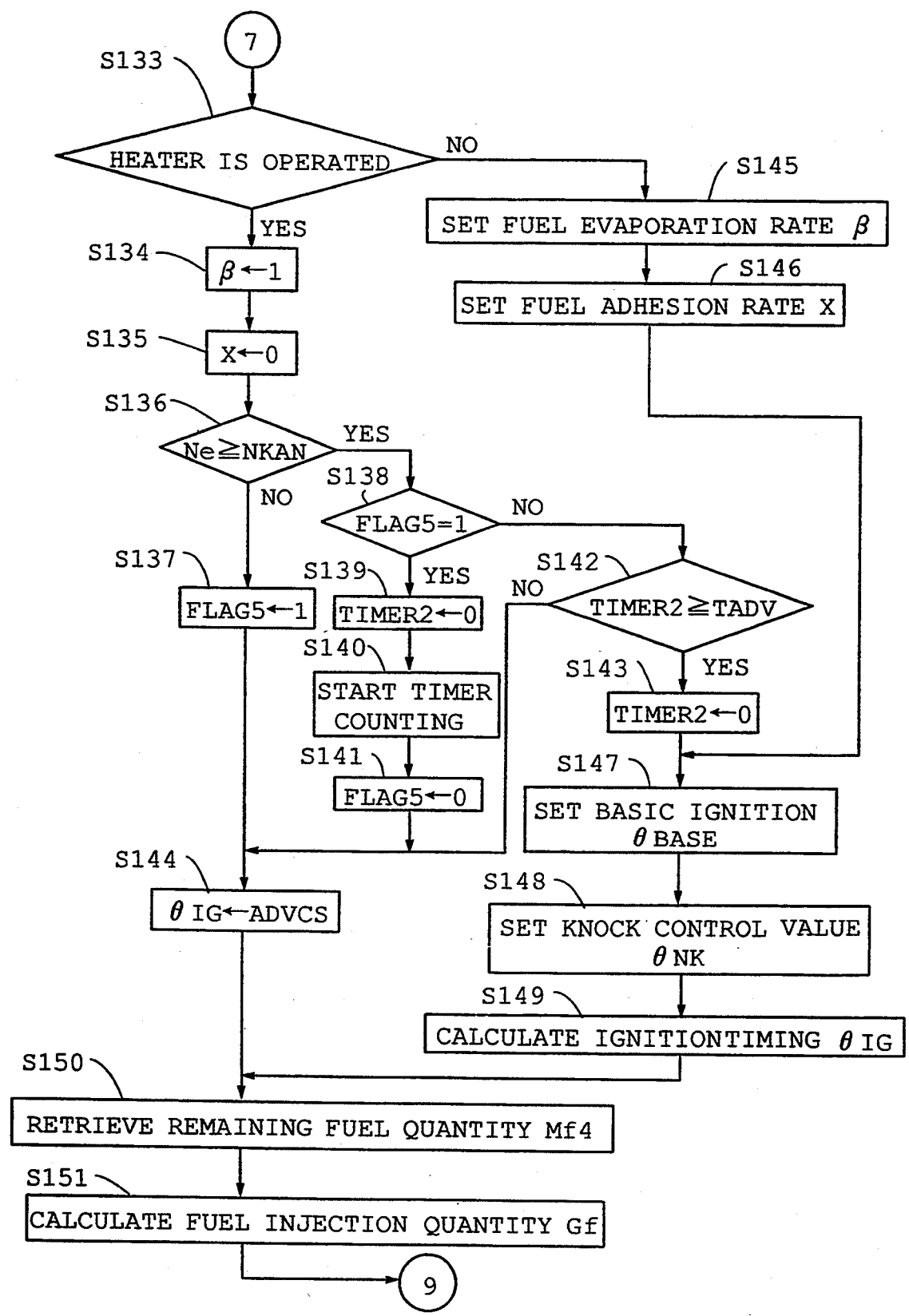
Figure 21:
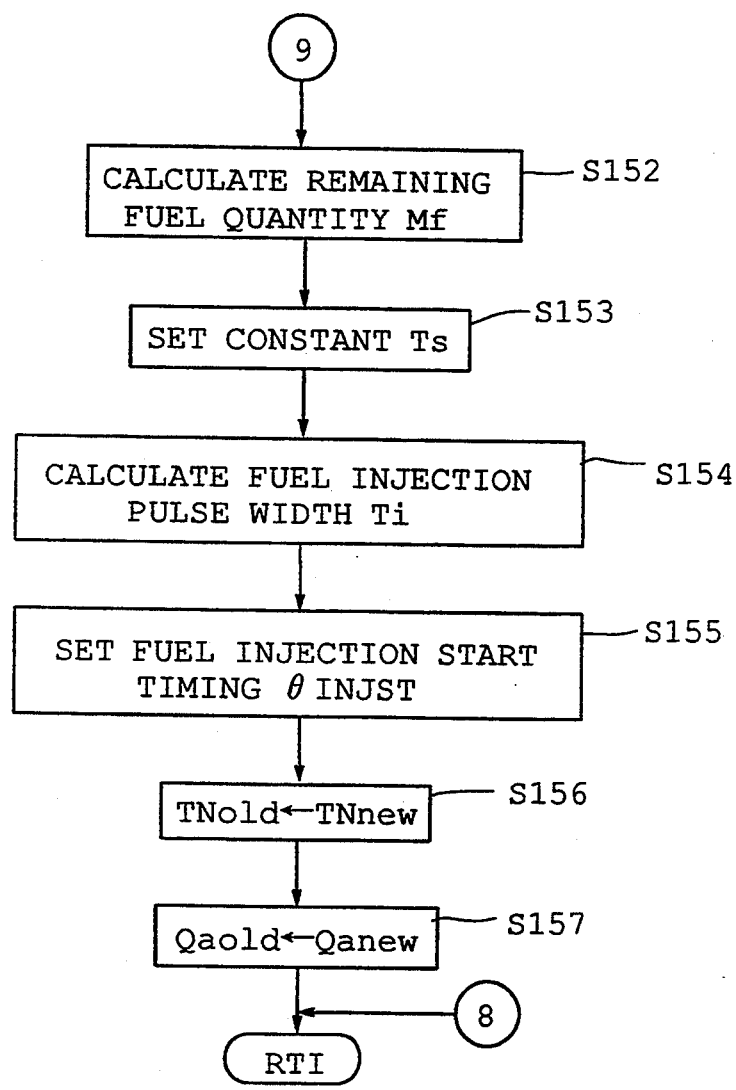

FIGS. 19 to 21 show an interrupting routine for determining a fuel injection pulse width Ti, a fuel injection start timing ΘINJST and an ignition timing ΘIG. The program is carried out at a predetermined interval.

At a step S121, it is determined whether the fuel injection inhibitor flag FLAG 3 is set. When the flag FLAG 3 is set, that is when the fuel injection is inhibited, the program proceeds to a step S122 where the fuel injection pulse width Ti is set at zero, and further to a step S123 where the ignition is prohibited.

More particularly, when a component of the fuel having a low boiling point remains in the cylinders, the intake ports 2a and the intake manifold 3 of the engine, and when the remaining fuel which is heated by the heater 23d at the last engine operation stays in the engine 1, relatively large combustion will occur. Such a large combustion will make the driver anxious or cause the driver to turn off the starter switch 60 so that starting the engine 1 is interrupted. Such a problem is prevented by the operations in steps S122 and S123.

If the fuel injection inhibitor flag FLAG 3 is reset at the step S121, that is, if the fuel injection is allowed, the program goes to a step S124 where it is determined whether the engine is operated. When the engine speed Ne is 0, the program goes to the step S122. On the other hand, when the engine is operated, the program goes to a step S125 where the engine speed Ne is retrieved from the RAM 44. Time period TIME1/2 of ½ rotation of crankshaft is calculated as follows.

$$TIME1/2 = 30/Ne \qquad (1)$$

The equation (1) is for calculating the time for one piston stroke in four-cylinder engine. For a combustion engine having n number of cylinders each operated at equal interval, the equation (1) is modified as follows.

$$TIME1/n/2 = (60/n/2)/Ne \qquad (1')$$

Thereafter, at a step S126, a weighting coefficient (weight of weighted mean) TNnew per stroke is calculated in accordance with the following equation.

$$TNnew = TIME1/2 \times COF \qquad (2)$$

where COF is a coefficient.

At a step S127, an intake air quantity (flow rate) Q (g/sec) which is obtained based on the output of the air flow meter 31 is read out. A weighting coefficient TNold and a corrected intake quantity Qaold which were obtained and stored in the last routine are also retrieved. In the first routine, both TNold and Qaold are set at zero.

A corrected intake air quantity Qanew is calculated at a step S128 as follows.

$$Qanew = (Qaold \cdot TNold + Q)/(1 + TNnew) \qquad (3)$$

Thereafter, an air quantity Qp which is induced into a cylinder during one intake stroke is calculated at a step S129 as follows.

$$Qp = Qanew \times TIME1/2 \qquad (4)$$

Thus, the first order lag is compensated, thereby preventing overshoot of the quantity of injection fuel during a transient state. The above-mentioned equation for obtaining the corrected intake air quantity Qanew is described in detail in the specification of Japanese Patent Application Laid-Open 2-5745 filed by the applicant of the present invention.

At a step S130, a miscellaneous enrichment coefficient COEF is set. The miscellaneous coefficient comprises various correction and compensation coefficients which are obtained based on outputs of the throttle position sensor 32a, the idle switch 32b and the coolant temperature sensor 34 so as to correct the injection fuel quantity at the start of the engine, a cold engine state, and wide-open throttle. The coefficient COEF does not include correction coefficient for the acceleration.

A feedback correcting coefficient $\alpha$ is set at a step 131 in accordance with the output signal of the $O_2$-sensor 35.

Figure 22:
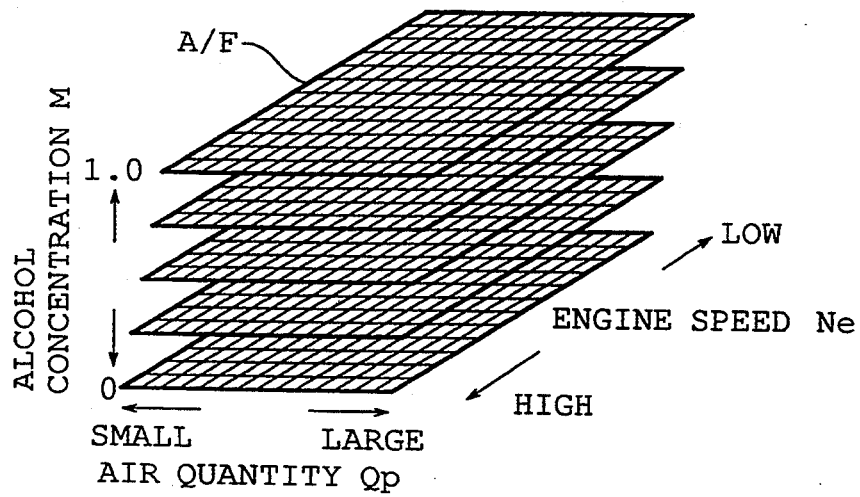
FIG. 22 is a conceptual diagram of a map storing desired air-fuel ratios.

At a step 132, a desired air-fuel ratio A/F is set by referring to a desired air-fuel ratio map MPA/F stored in the RAM 44. As shown in FIG. 22, the map MPA/F stores a plurality of stoichiometric air-fuel ratios A/F in accordance with the alcohol concentration M, the air quantity Qp and the engine speed Ne as parameters.

A step S133 determines whether or not the heater is operated. If the heater is operated, the program goes to a step S134 where a rate $\beta$ of the fuel evaporation is set at the value of 1 ($\beta \leftarrow 1$). The fuel evaporation rate $\beta$ is a rate at which the fuel adhered on a wall of the intake port 2a vaporizes during the two crankshaft rotations, that is in one engine cycle. A rate X of fuel adhesion which is a rate of the fuel adhered on the wall of the intake port 2a to the quantity of injected fuel is set at zero at a step S135 (X←0).

More particularly, the fuel injected from the injector 24 strikes the heating element 23a which is heated by the heater 23d of the intake port heater unit 23. When the heater is operated, the fuel evaporates in an instant without adhering on the wall. Since the fuel is entirely evaporated without adhering on the wall, the rates $\beta$ and X are assumed as 1 and 0, respectively. Thus, an appropriate air-fuel ratio is obtained. Namely, the air-fuel mixture is prevented from becoming overrich so that the starting characteristics and the fuel consumption are improved.

At a step S136, the engine speed Ne is compared with the predetermined reference NKAN to determine whether the engine 1 is completely started. When Ne<NKAN, this means that the engine 1 is in a starting state before complete combustion, and an engine starting state flag FLAG 5 is set at a step S137. Thereafter, the ignition timing $\Theta IG$ is set at a predetermined fixed timing (angle) ADVcs which is, for example, the timing when the crank pulse signal is produced from the crank angle sensor 37 at the angle BTDC$\Theta$3 (10° CA).

When Ne≧NKAN, the program goes to a step S138 where the engine starting state flag FLAG 5 is checked. When the flag FLAG 5 is set, it means that the engine 1 was not started at the last routine, and is completely started in the present routine for the first time. At a step S139, a timer TIMER 2 is cleared. The timer TIMER 2 is for measuring the time during which the fixed ignition timing ADVcs is maintained. The timer TIMER 2 is started counting at a step S140. At a step S141, the engine starting state flag FLAG 5 is reset, and the program goes to the step S144 where the ignition timing is set at the fixed timing ADVcs.

At the step S138, when the engine starting state flag FLAG 5 is reset, the program proceeds to a step S142 where the count of the timer TIMER 2 is compared with the fixed timing period TADV during which the ignition timing is set to the fixed timing ADVcs. When TIMER 2<TADV, the program goes to the step S144 to continue setting the timing at the fixed ignition timing ADVcs. If TIMER 2≧TADV, the program goes to a step S147 through a step S143 where the timer TIMER 2 is cleared.

Figure 25:
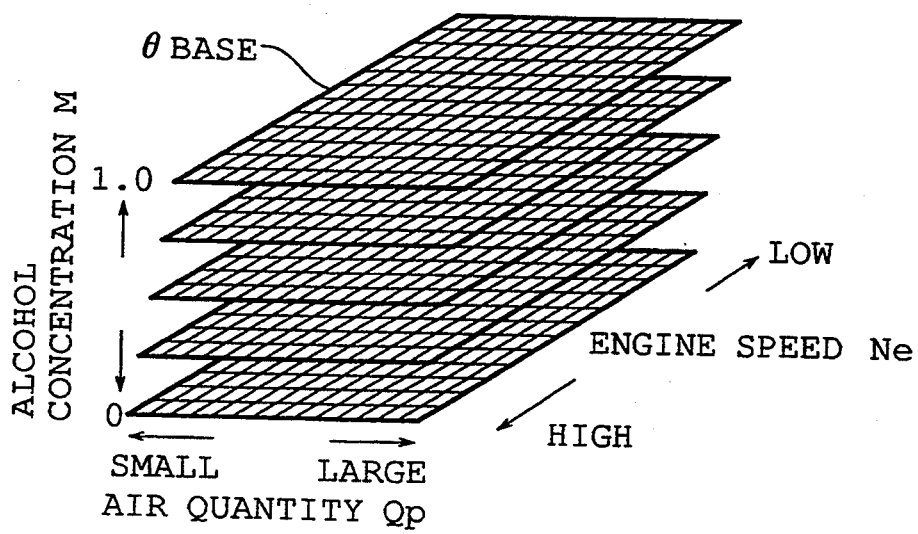
FIG. 25 is a conceptual diagram of a map storing basic fuel ignition timings.

At the step S147, a basic ignition timing $\Theta BASE$, namely an optimum crank angle, which is determined based on the angle $\Theta 1$, is set by referring to a basic ignition timing map MP$\Theta$BASE shown in FIG. 25, in accordance with the engine speed Ne, the air quantity Qp induced during one intake stroke per cylinder and the alcohol concentration M as parameters. The basic fuel injection timings $\Theta BASE$ in the map MP$\Theta$BASE, which are based on experiments, are set such that the advance angle increases as the alcohol concentration M increases, provided the air quantity Qp and the engine speed Ne are constant.

At a step S148, a knock control value (angle) $\Theta NK$ is set in accordance with the signal from the knock sensor 33, so that the ignition timing $\Theta IG$ is calculated as follows at a step S149.

$$\Theta IG = \Theta BASE + \Theta NK$$

Figure 24:
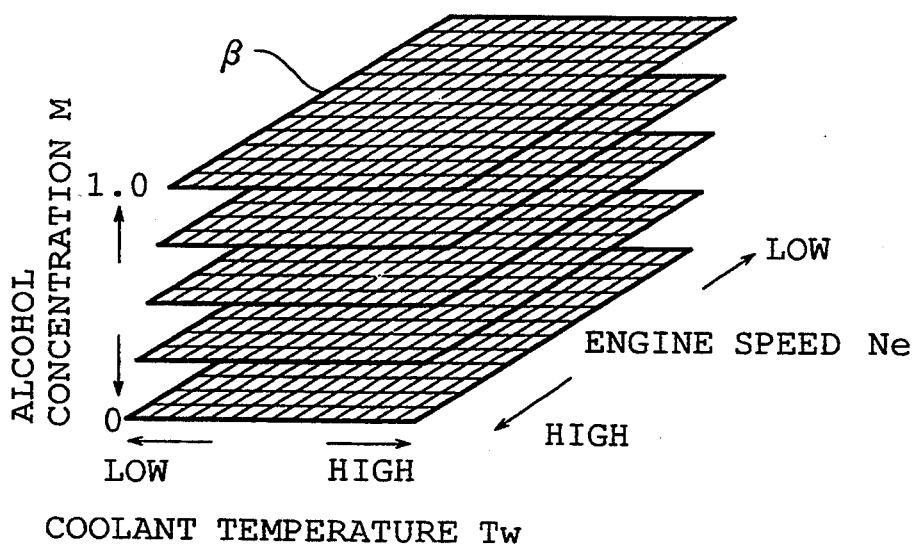
FIG. 24 is a conceptual diagram of a map storing fuel evaporation rates.

When it is determined that the heater is not operated at the step S133, the program goes to a step S145 where the fuel evaporation rate $\beta$ per two crankshaft rotations is set by referring to fuel evaporation rate map MP$\beta$ shown in FIG. 24 in accordance with engine speed Ne, coolant temperature TW and alcohol concentration M. The fuel evaporation rate increases with increase of the temperature of the wall of the intake port 2a. To the contrary, as the engine speed Ne increases, the interval between intake strokes is decreased so that the period during which the fuel adheres on the wall is shortened, thereby decreasing the fuel evaporation rate $\beta$. With an increase of the alcohol concentration M, latent heat at evaporation is increased so that the fuel is less subject to evaporate, and hence the fuel evaporation rate $\beta$ becomes low.

Figure 23:
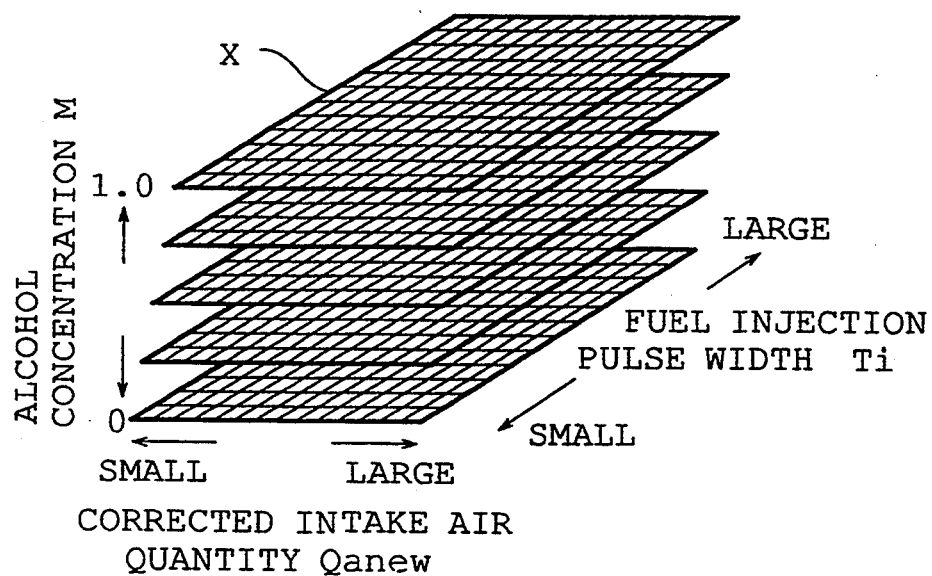
FIG. 23 is a conceptual diagram of a map storing fuel adhesion rates.

At a step S146, fuel adhesion rate X is set by referring to fuel adhesion rate map MPX shown in FIG. 23 in accordance with the alcohol concentration M, corrected intake air quantity Qanew and the fuel injection pulse width Ti obtained in the last routine. In the first routine, since no fuel injection pulse width Ti is stored, the rate X is set at zero. As the intake air quantity Qanew increases, it takes a longer time to atomize the fuel so that the fuel adhesion rate X increases. Supposing that the intake air quantity Qanew is constant, the quantity of fuel adhered on the wall changes in accordance with the quantity of fuel injection with a small fluctuation. Thus the fuel adhesion rate X is relatively decreased with increase of the fuel injection pulse width Ti. The adhesion rate X relatively increases as the alcohol concentration M of the fuel, and hence the latent heat at evaporation thereof increase.

Thereafter, the program proceeds to S149 passing the steps S147 and S148 to determine the ignition timing $\Theta$IG.

The program from the steps S149 and S144 further proceeds to a step S150 where an intake port remaining fuel quantity Mf4 which was set in a routine executed four strokes or one engine cycle before the present stroke is read out. The quantity Mf4 is zero in the first to fourth routines. At a step S151, a quantity Gf of fuel required at each fuel injection is calculated as follows.

$$Gf=\{Qp/(A/F)\cdot COEF-Mf4\cdot\beta\}/(1-X) \qquad (5)$$

The equation (5) is explained hereinafter. In the engine 1, fuel is injected through the injector 24 to the intake port 2a of each cylinder at every 720° CA, that is, at every two crankshaft rotations. A part of the injection fuel adheres on the walls of the intake valves and intake ports without entering the combustion chamber of the cylinder. The adhered fuel evaporates while the crankshaft rotates twice, so that the evaporated fuel is induced into the combustion chamber together with the newly injected fuel during the next intake stroke. More particularly, a quantity Ge of fuel which is actually induced into the cylinder is the sum of fuel quantity $(1-X)$Gi and vaporized quantity Mf4·$\beta$. Therefore, the quantity Ge is expressed as follows.

$$Ge=(1-X)\cdot Gf+Mf4\cdot\beta \qquad (6)$$

In accordance with the equation (6), the quantity Gf of fuel necessary for one injection is expressed as, $$Gf=(Ge-Mf4\cdot\beta)/(1-X) \qquad (7)$$

Since the quantity Ge, which is to be actually supplied to the cylinder, can be regarded as a desired quantity based on the desired air-fuel ratio A/F and the air quantity Qp and since the enriched desired air-fuel ratio is (A/F)/COEF, $$Ge=Qp\cdot COEF/(A/F) \qquad (8)$$

When the quantity Ge in the equation (7) is substituted by the equation (8), the equation (5) is obtained.

The program further proceeds to a step S152 where a remaining fuel quantity Mf in the intake port is calculated in accordance with the following equation.

$$Mf=(1-\beta)\cdot Mf4+X\cdot Gf \qquad (9)$$

Namely, the remaining fuel quantity Mf is the sum of the remainder $(1-\beta)\cdot$Mf4 which is calculated by subtraction of quantity of evaporated fuel from the quantity of adhered fuel in the last stroke, and the quantity X·Gf of fuel injected and adhered in the present stroke. In the first to fourth routines, the quantity Mf is calculated as $$Mf=X\cdot Gf$$

At a step S153, a constant Ts relative to a time lag in the fuel injection system is set in accordance with a battery voltage. There, after the actual fuel injection pulse width Ti is calculated as follows at a step S154.

$$Ti=K\cdot Gf\cdot a+Ts \qquad (10)$$

where K is a coefficient relative to the characteristic of the injector.

Since the fuel injection quantity Gf is corrected in consideration of a predicted quantity of fuel adhered on the walls and vaporizing quantity of the adhered fuel, the air-fuel mixture induced in the cylinder is prevented from becoming rich at a transient state, particularly in a low engine speed range.

Figure 26:
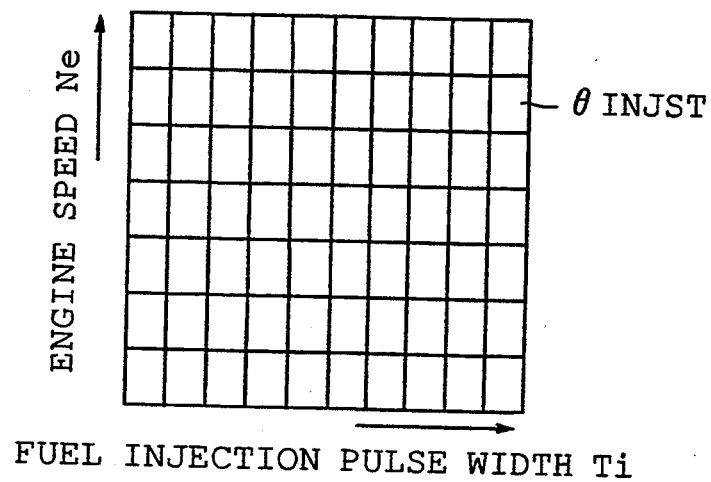
FIG. 26 is a conceptual diagram of a map storing fuel injection start crank angles.

At a step S155, a fuel injection start timing $\Theta$INJST is set by referring to a fuel injection start crank angle map MP$\Theta$INJST shown in FIG. 26, in accordance with the engine speed Ne and fuel injection pulse width Ti as parameters. The advance angle of the fuel injection start timing $\Theta$INJST is increased as the engine speed Ne and the fuel injection pulse width Ti increase.

At steps S156 and S157, the weighting coefficient TNold of the last routine is rewritten with the new weighting coefficient TNnew obtained at the step S126 and the intake air quantity Qaold of the last routine is rewritten with the new intake air quantity Qanew obtained at the step S128, respectively.

(Ignition, Fuel Injection)

Figure 27:
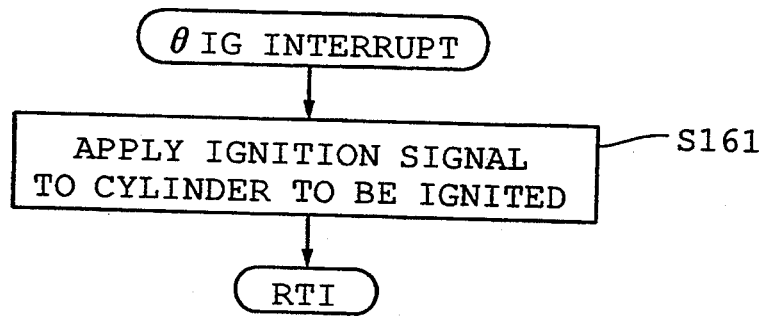
FIG. 27 is a flowchart describing an ignition operation.
Figure 28:
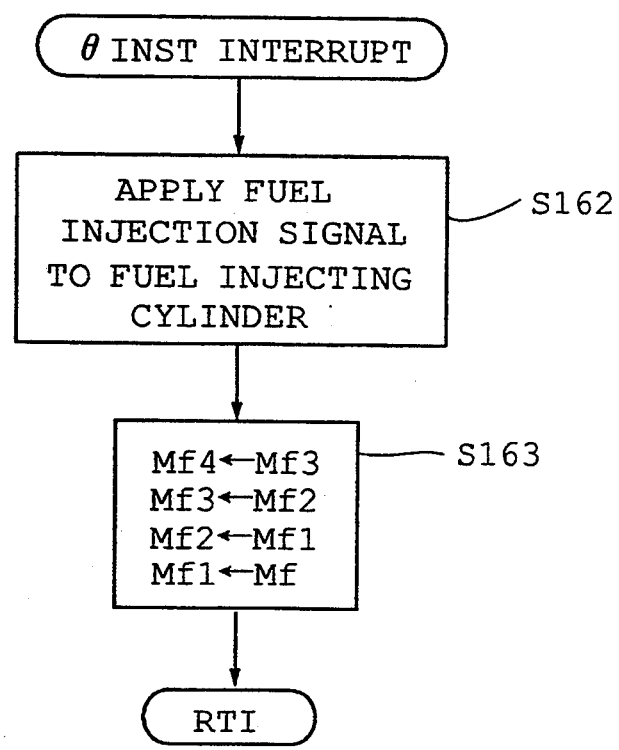
FIG. 28 is a flowchart describing a fuel injection operation.

When the ignition timing $\Theta$IG, fuel injection pulse width Ti and fuel injection start timing $\Theta$INJST are thus determined, an ignition signal and a fuel injection signal are supplied in accordance with the flowchart shown in FIGS. 27 and 28, respectively.

An interrupt routine shown in FIG. 27 is executed every 180° CA, when the actual crank angle calculated based on the crank pulse signal reaches ignition timing $\Theta$IG set at the steps S144 or S149 in the program for determining the ignition timing and fuel injection quantity (FIGS. 19 to 20) with respect to each cylinder. At a step S161, the ignition signal is applied to the cylinder No.i which is determined at the step S111 in the program for discriminating the cylinder and calculating the engine speed (FIG. 18).

Similarly, an interrupt routine shown in FIG. 28 is executed every 180° CA, when the actual crank angle calculated based on the crank pulse signal reaches the fuel injection timing ΘINJST which is set at the step S155. At a step S162, a fuel injection pulse signal having the fuel injection pulse width Ti calculated at the step S154 is applied to the fuel injector 24 of the cylinder No.(i+2) as set at the step S112 of the cylinder discriminating operation.

At a step S163, a remaining fuel quantity Mf1 calculated at the step S152 in the last routine of the program for determining the fuel injection quantity and ignition timing is rewritten with the remaining fuel quantity Mf obtained in the present routine. Similarly, each of the remaining quantities Mf2 to Mf4, that is, the quantities obtained in two to four previous routines, are rewritten with the quantities Mf1 to Mf3. Thus, the remaining fuel quantity Mf4 retrieved at the step S150 is the quantity remaining one cycle before. That is to say, the quantity Mf4 is the quantity which actually exists in the intake port of the same cylinder. When the engine has n number of the cylinders, the remaining fuel quantity Mfn is rewritten with the remaining fuel quantity Mfn−1 obtained in the next routine for the same cylinder.

Figure 30A:
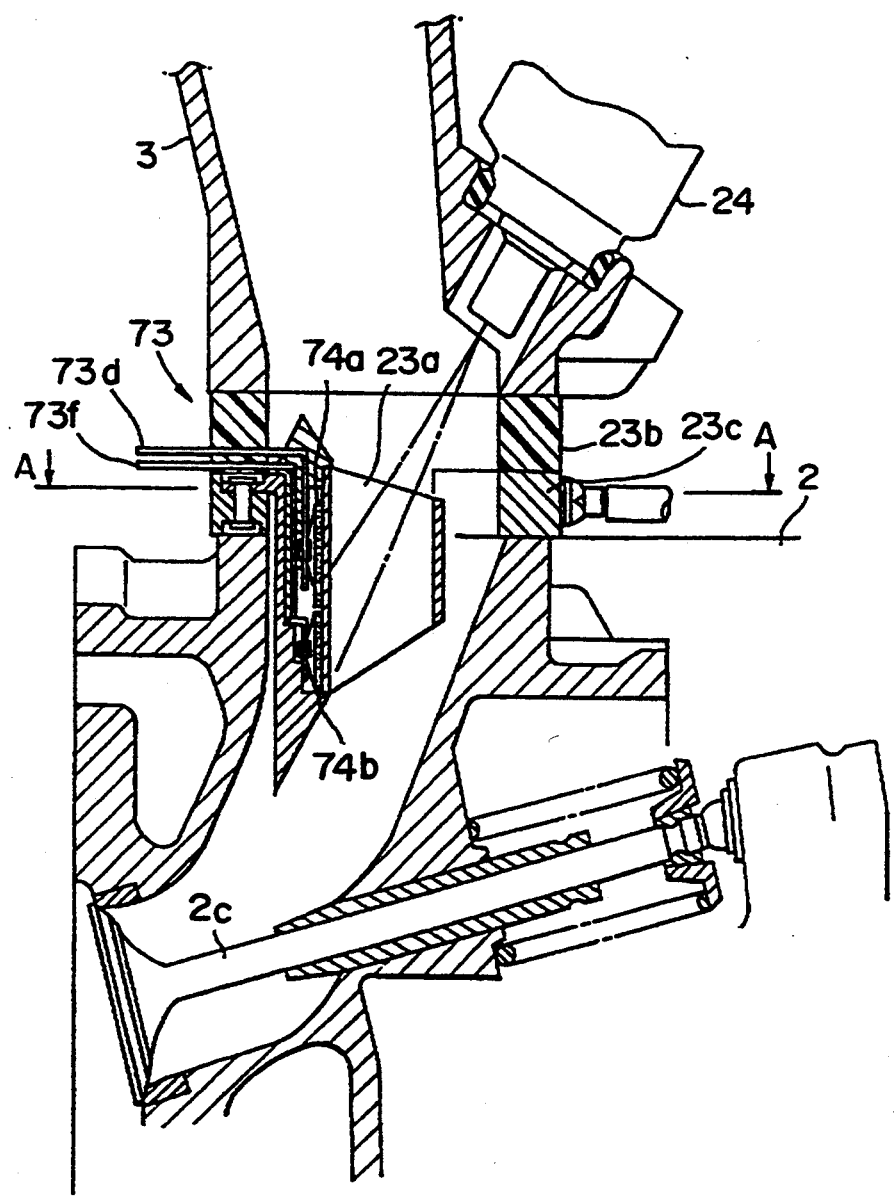
FIGS. 30a and 30b are sectional views showing a further modification of the heater unit.
Figure 30B:
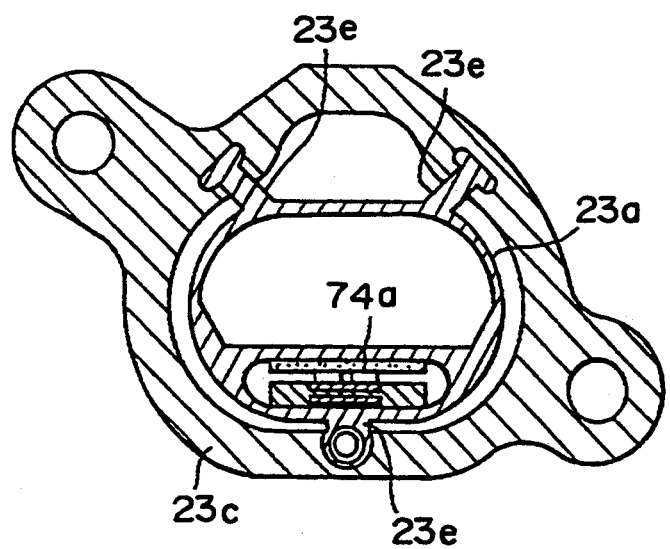

FIGS. 30a and 30b show a further modification of the heater unit.

In general, in order to reduce the electric power consumption, it is preferable to turn off the heater in the heater unit 23 immediately after the engine 1 is warmed up. Furthermore, it is preferable to control the heater in response to the engine operating conditions.

Figure 31:
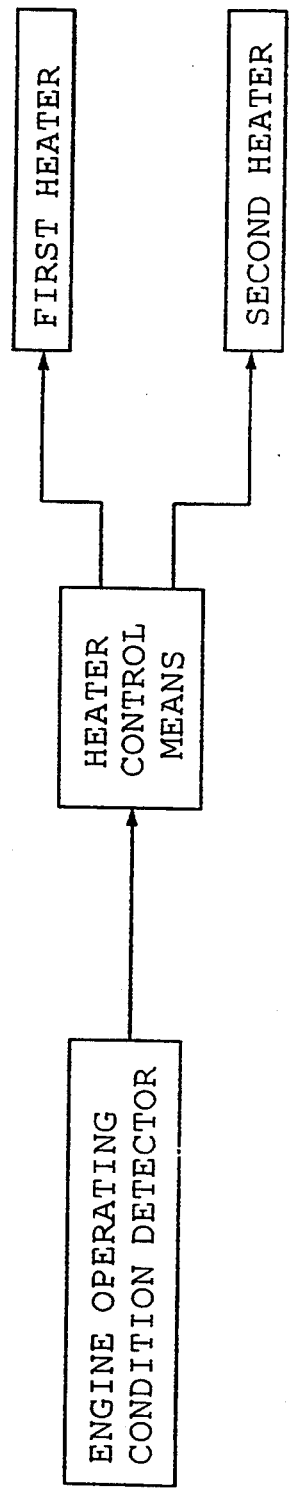

FIG. 31 shows the principle of a control system of the heater unit 23.

The control system has a first heater and a second heater, engine operating condition detector means for detecting the engine operating conditions and producing a detected signal, and heater control means responsive to the detected signal for selectively controlling the first and second heaters.

Figure 32:
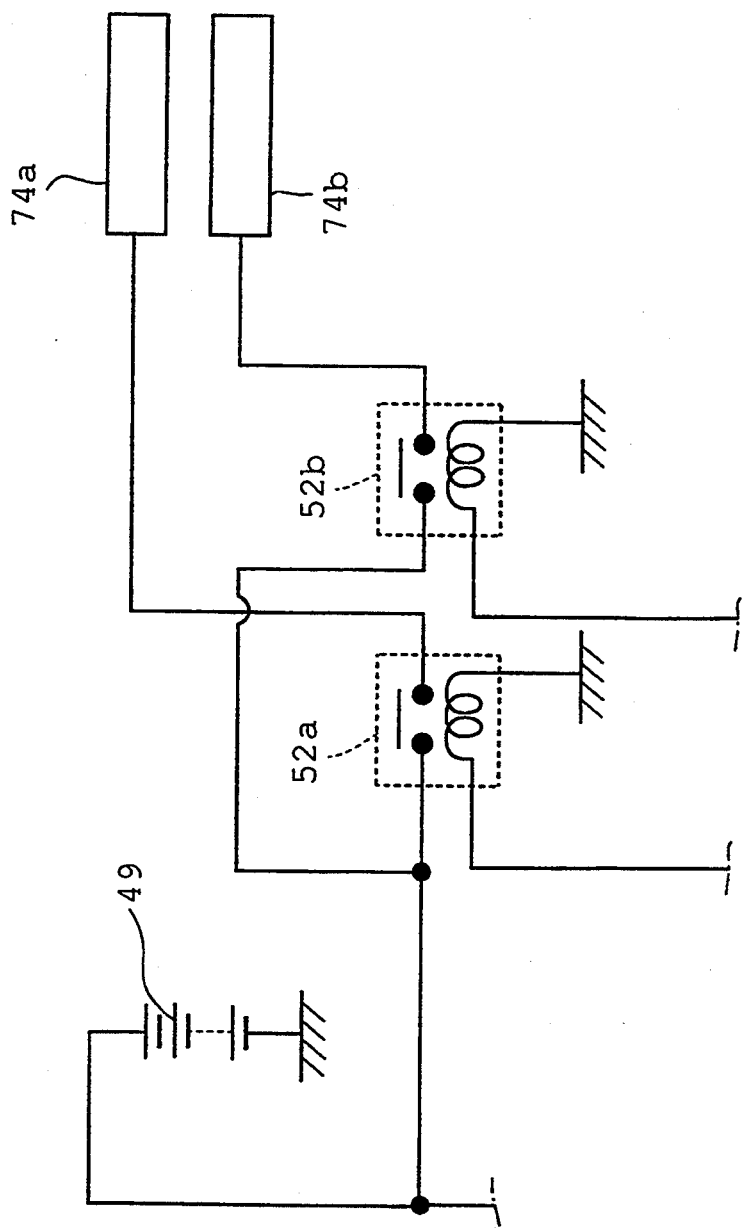
FIG. 32 shows a circuit of the heater unit.

Referring to FIGS. 30a and 30b, a heater unit 73 has the flange 23c, the insulator 23b, and the cylindrical heating element 23a mounted in the flange 23c through the stays 23e. A first heater 74a comprising positive temperature coefficient (PTC) pill is provided in the heating element 23a, and a second heater 74b of the PTC pill is provided in the heating element at the lower portion of the first heater 74a. As shown in FIG. 32, a terminal 73d of the first heater 74a is connected to the battery 49 through a contact of a relay 52a and a terminal 73f of the second heater 74b is connected to the battery through a contact of a relay 52b.

Figure 33:
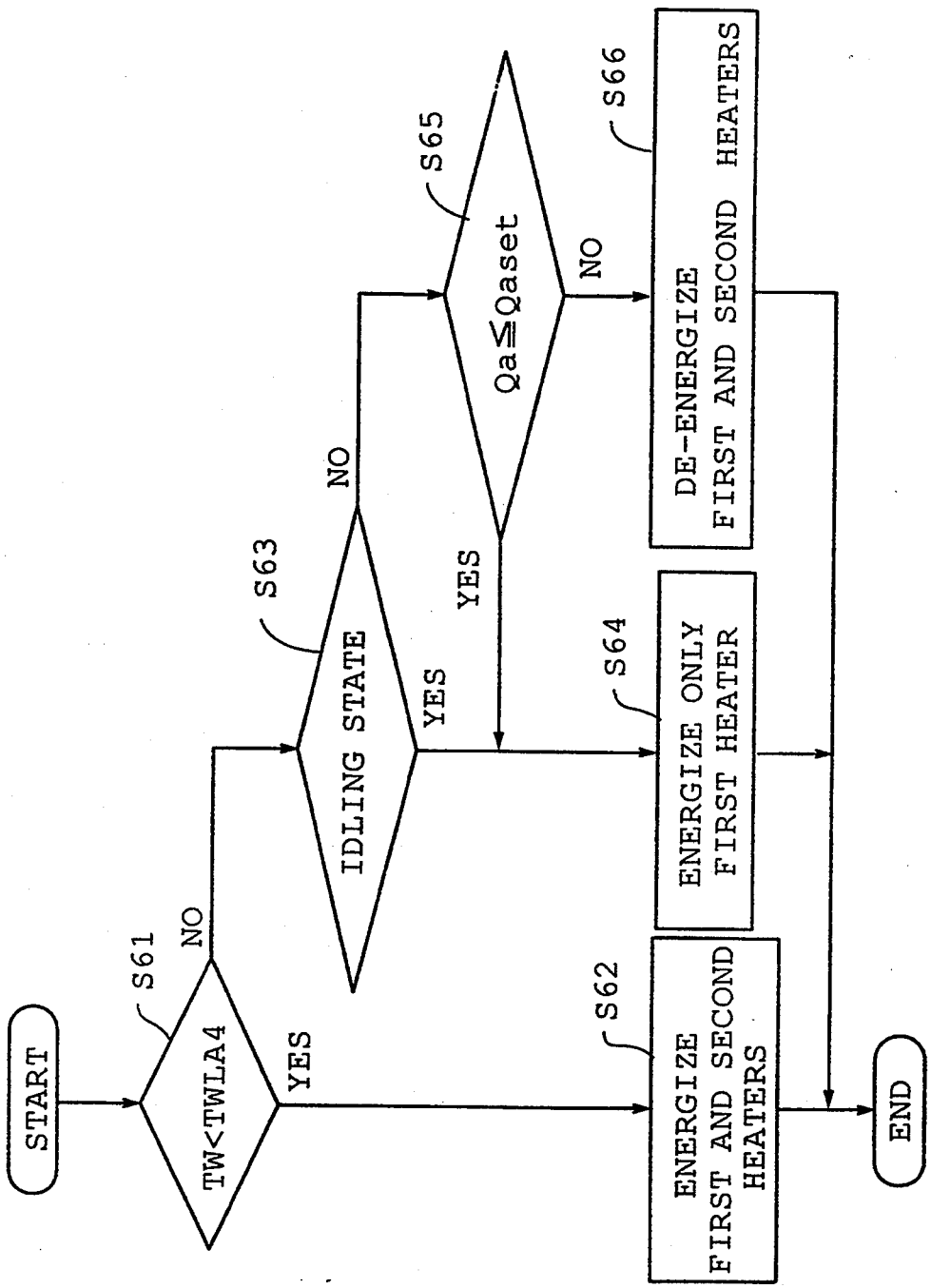
FIG. 33 is a flowchart showing an operation for controlling the heater unit.

The operation of the heater control system will be described with reference to the flowchart of FIG. 33.

At a step S61, the coolant temperature TW detected by the coolant temperature sensor 34 is compared with the warmup completion temperature TWLA4 (for example between 50° and 60° C.). If TW<TWLA4, the program goes to a step S62 where the heater relays 52a and 52b are turned on to energize the first and second heaters 74a and 74b through the terminals 73d and 73f. If TW≧TWLA4 at the step S61, namely it means that the engine is warmed up, the program goes to a step S63. At the step S63, it is determined whether the engine is in the idling state or not in accordance with the idle switch 32b. If the idle switch 32b is turned on, the program goes to a step S64 where only the first heater 74a is energized. If the idle switch 32b is turned off at the step S63, the program goes to a step S65 where the intake air quantity Qa per one stroke is compared with a predetermined extremely light load determining value Qaset. The value Qaset represents the engine in an extremely light load after the warmup. If Qa≦Qaset, namely the engine load is extremely light and the fuel is not vaporized much, the program goes to the step S64. If Qa>Qaset, namely the engine is somewhat loaded and the vaporization of the fuel is improved, the program goes to a step S66 where the relays 52a and 52b are turned off to de-energize the heaters 74a and 74b.

In the modification, the first and second heaters are precisely controlled in accordance with the engine operating conditions. Thus, electric power waste is prevented and the fuel is effectively vaporized, thereby improving the starting characteristics.

Figure 34:
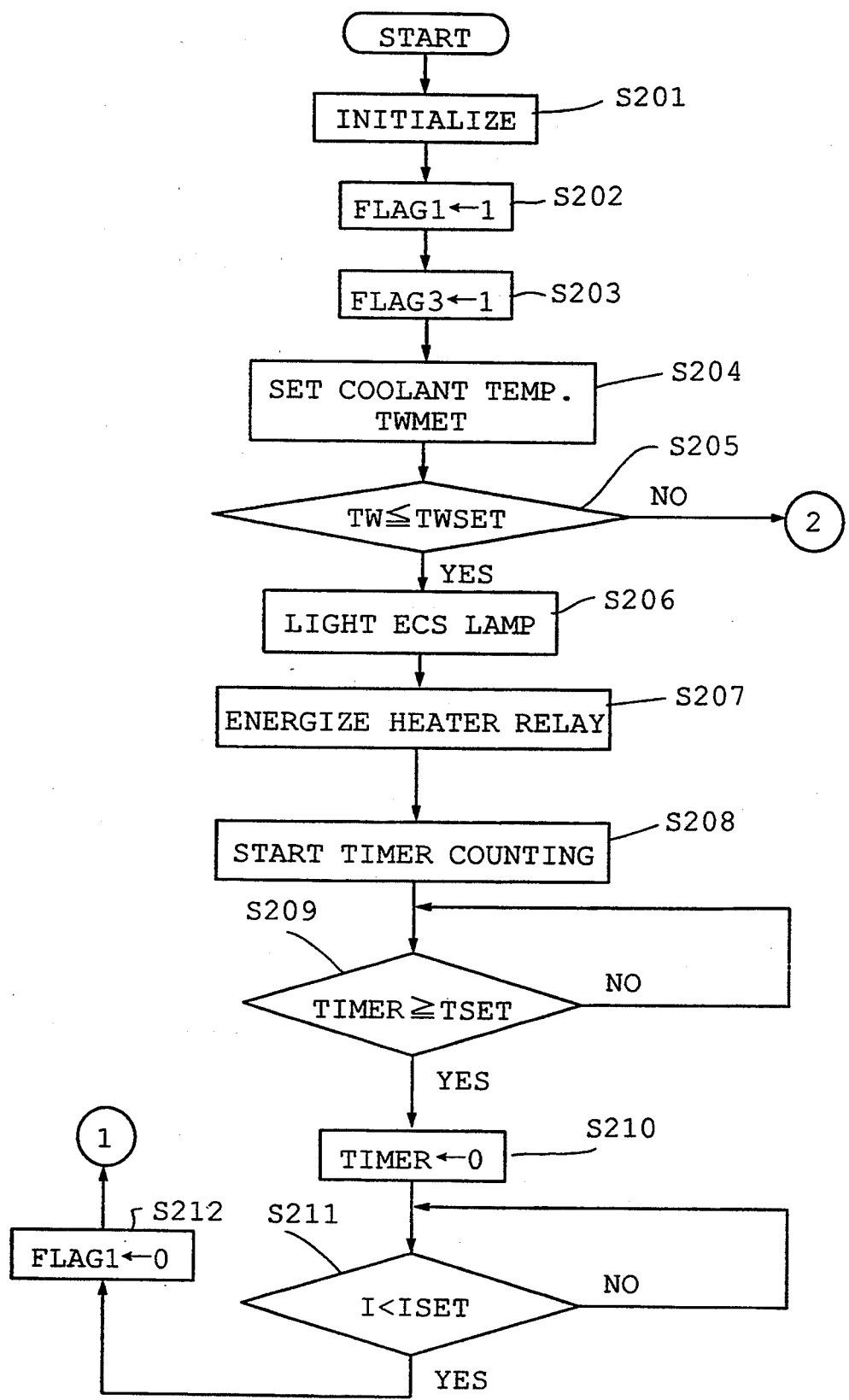
FIGS. 34 and 35 show a flowchart of a second embodiment of the present invention.
Figure 35:
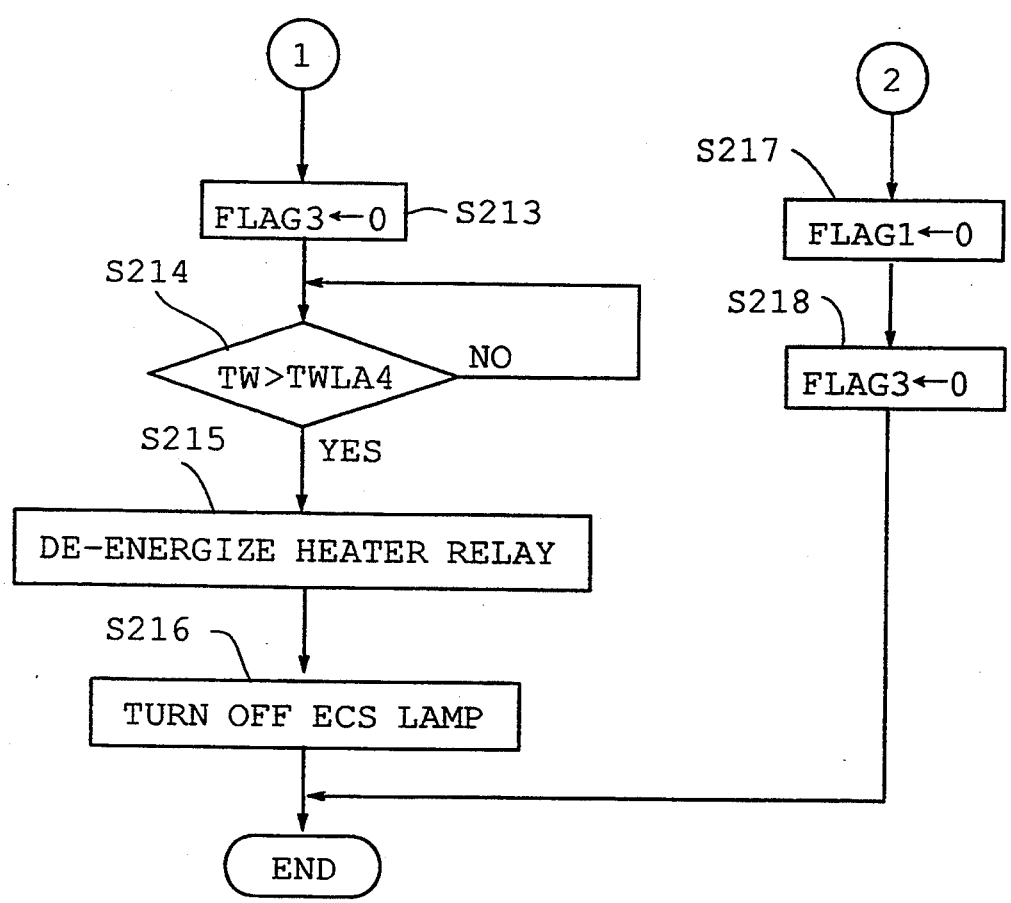

Referring to FIGS. 34 and 35 showing the second embodiment of the present invention, the same reference characters as FIGS. 1 to 4 represent the same processes as the latter. The program is initialized at a step S201 and a starter current inhibitor flag FLAG 1 is set at a step S202, and a fuel injection inhibitor flag FLAG 3 is set at a step S203.

At a step S204, a start-enabling coolant temperature TWMET is set by referring to a start-enabling coolant temperature map MPTW in accordance with the alcohol concentration M as a parameter. At a step S205, the coolant temperature TW is compared with a reference temperature TWMET.

When TW≦TWMET, it is determined that the engine is in a start-unable condition, the program goes to a step S206, where the ECS lamp 59 is lighted, thereby informing that the heater 23d is excited to heat the fuel. Accordingly, the heater relay 52 is energized at a step S207 to operate the heater 23d, and the timer starts counting at a step S208.

When timer count TIMER becomes larger than a set count TSET at a step S209, the timer is cleared (step S210). At a step S211, current I detected by the current sensor 63 is compared with a reference heating current ISET. When I<ISET, the heating is completed and the program proceeds to a step S212 where the starter current inhibitor flag FLAG 1 is cleared to allow the current to pass to the starter motor 62. At a step S213, the fuel injection inhibitor flag FLAG 3 is reset. Thereafter it is determined whether the coolant temperature TW reaches a warmup temperature TWLA4 at a step S214.

When TW>TWLA4, the program proceeds to a step S215 where the heater relay is de-energized, and the ECS lamp 59 is turned off at a step S216.

On the other hand, when TW>TWMET at the step S205, it is determined that the engine is in a start-enabling condition, the program goes to a step S217 for carrying out the start-enabling condition process. At the step S217, the starter current inhibitor flag FLAG 1 is cleared to allow the current to flow in the starter motor. The fuel injection inhibitor flag FLAG 3 is cleared at a step S218, and the program ends.

Figure 36:
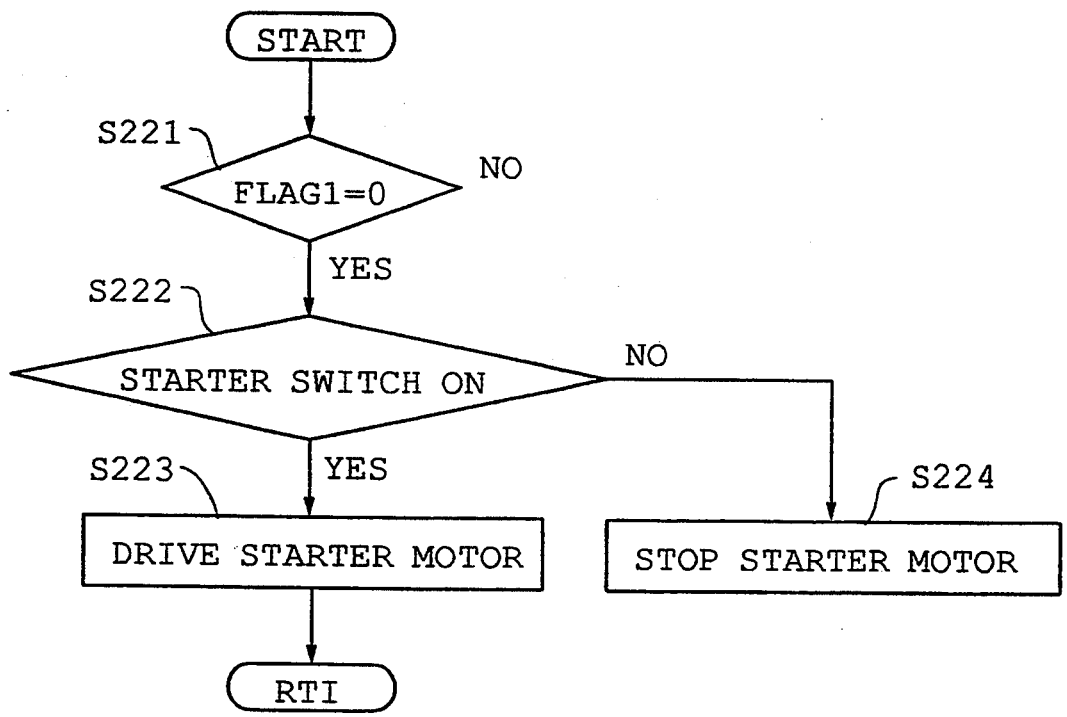
FIG. 36 is a flowchart of another starter motor control operation.

Referring to FIG. 36, at a step S221, it is determined whether the starter current inhibitor flag FLAG 1 is set. When the flag FLAG 1 is cleared, the program goes to a step S222 to determine whether the starter switch 60 is turned on. If the starter switch 60 is turned on, the starter motor relay 61 is energized to drive the starter motor 62 at a step S223.

On the other hand, when the starter current inhibitor flag FLAG 1 is set, or the starter switch 60 is turned off, the program goes from the steps S221 and S222 to a step S224 where the starter motor relay 61 is de-energized to stop the starter motor 62.

Figure 37:
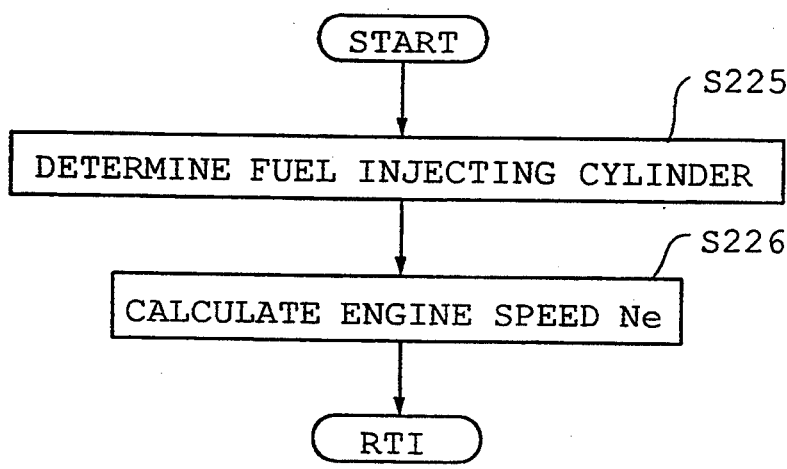
FIG. 37 is a flowchart of another cylinder discrimination operation.

Referring to FIG. 37, at a step S225, the igniting cylinder is determined in accordance with the cam pulse signal from the cam angle sensor 39 and at a step S226, the fuel injecting cylinder is determined.

Thereafter, at a step S227, an engine speed Ne is calculated in dependency on the crank pulse signals from the crank angle sensor 37.

Figure 38:
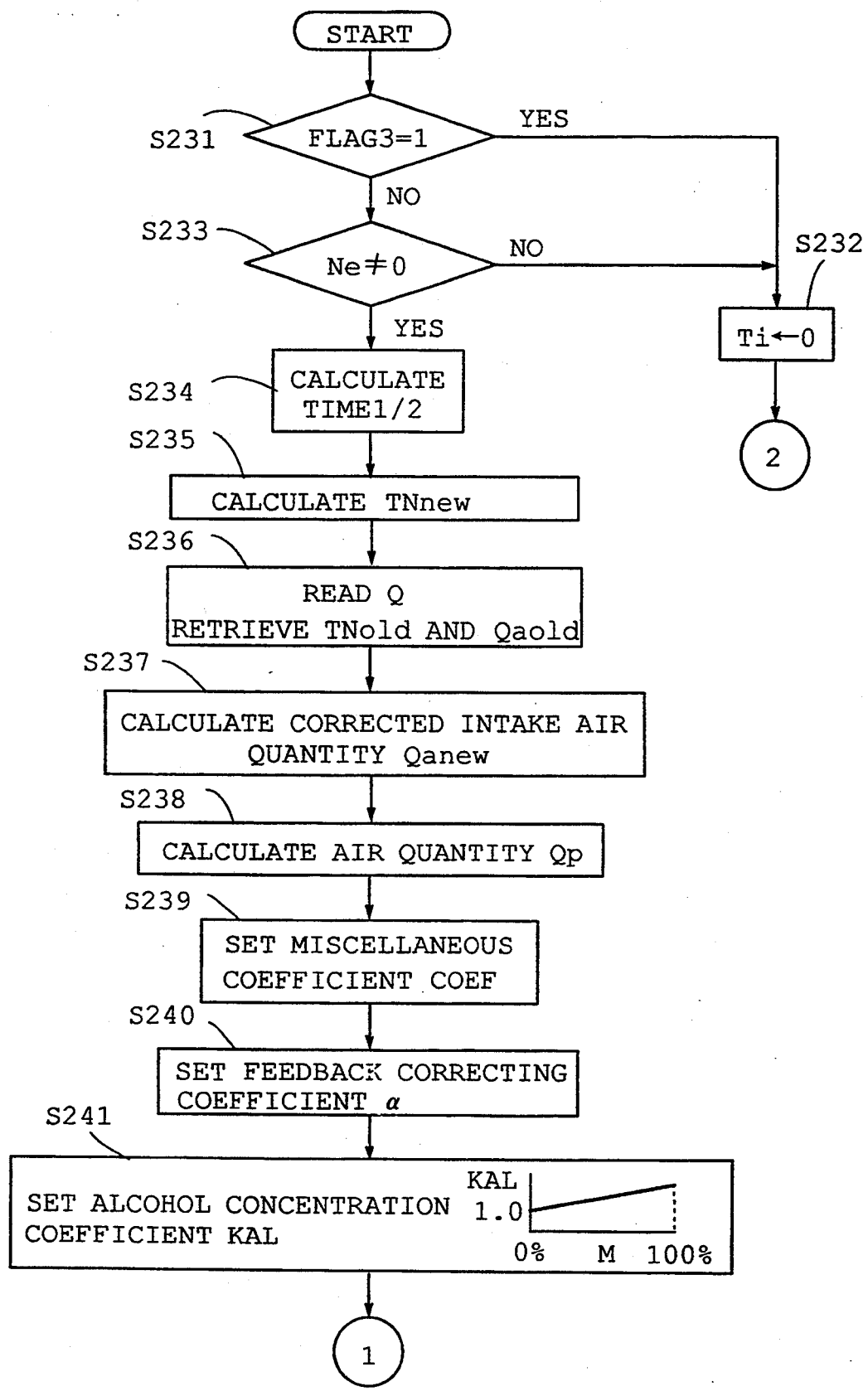
FIGS. 38 and 39 show a flowchart of another fuel injection quantity determining operation.
Figure 39:
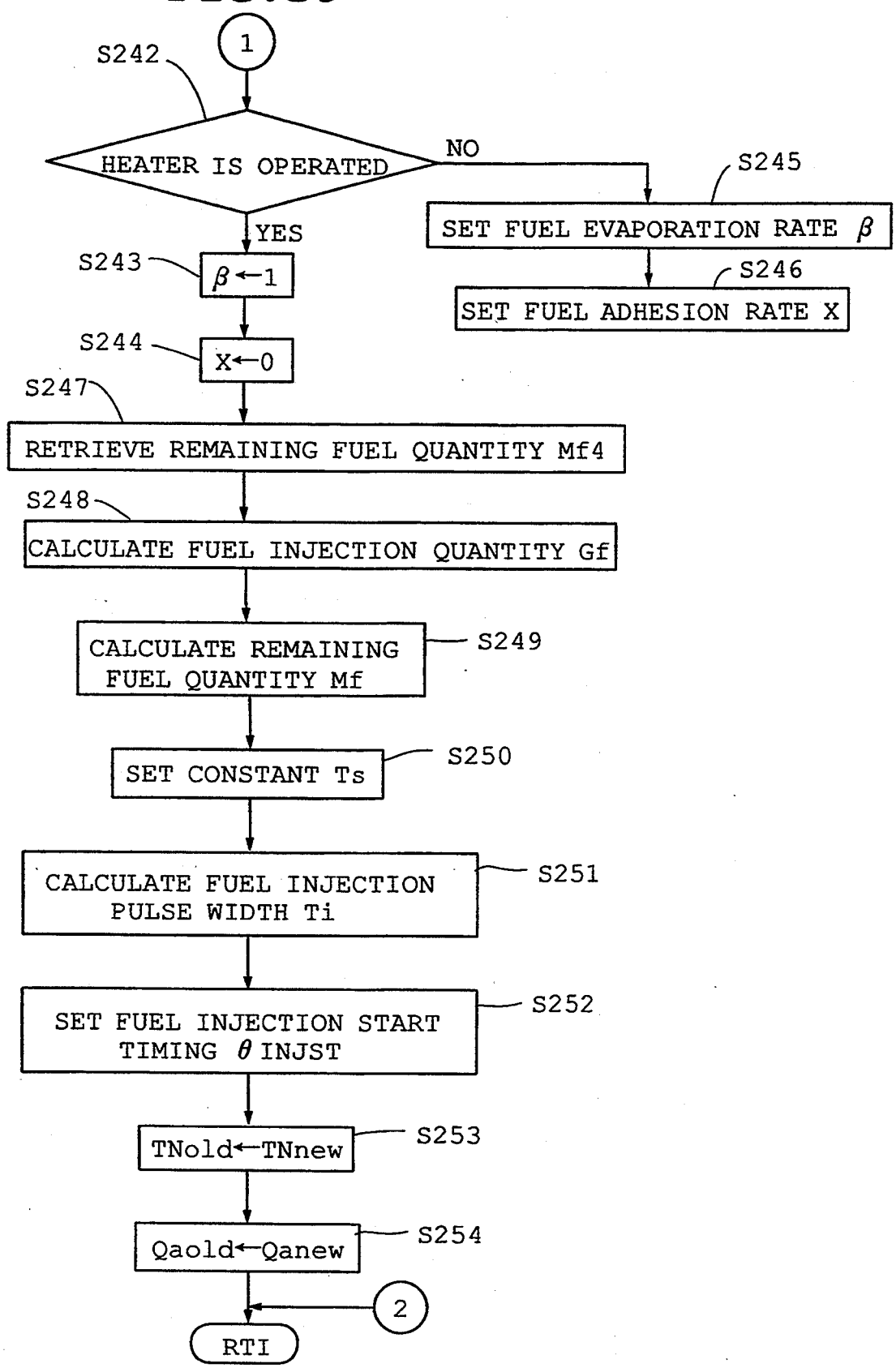

Referring to FIGS. 38 and 39, at a step S231, it is determined whether the fuel injection inhibitor flag FLAG 3 is set. When the flag FLAG 3 is set, the program proceeds to a step S232 where the fuel injection pulse width Ti is set at zero.

If the fuel injection inhibitor flag FLAG 3 is reset at the step S231, the program goes to a step S233 where it is determined whether the engine is operated. When the engine speed Ne is 0, the program goes to the step S232. On the other hand, when the engine is operated, the program goes to a step S234 where the engine speed Ne is retrieved from the RAM 44. Time period TIME1/2 of ½ rotation of crankshaft is calculated as described in the first embodiment.

At a step S235, a weighting coefficient TNnew per stroke is calculated. At a step S236, an intake air quantity Q is read out. A weighting coefficient TNold and a corrected intake quantity Qaold are also retrieved. A corrected intake air quantity Qanew is calculated at a step S237, and then an air quantity Qp is calculated at a step S238.

At a step S239, a miscellaneous enrichment coefficient COEF is set.

A feedback correcting coefficient α is set at a step S240 in accordance with the output signal of the O$_2$-sensor 35.

At a step S241, an alcohol concentration coefficient KAL is retrieved from a map based on the alcohol concentration M for correcting the air-fuel ratio with the alcohol concentration. Thus, a desired air-fuel ratio A/F is set.

A step S242 determines whether or not the heater is operated. If the heater is operated, the program goes to a step S243 where a rate β of fuel evaporation is set at the value of 1 (β←1). A rate X of fuel adhesion is set at zero at a step S244.

When it is determined that the heater is not operated at the step S242, the program goes to a step S245 where the fuel evaporation rate β is set in accordance with engine speed Ne, coolant temperature Tw and alcohol concentration M. At a step S246, rate X of adhesion of the fuel on the wall of the intake port 2a is set by referring to a fuel adhesion rate map MPX in accordance with the alcohol concentration M, corrected intake air quantity Qanew and the fuel injection pulse width Ti obtained in the last routine.

The program from the steps S244 and S246 proceeds to a step S247 where an intake port remaining fuel quantity Mf4 is read out. At a step S248, a quantity Gf of the fuel is calculated.

The program proceeds to a step S249 where a remaining fuel quantity Mf in the intake port is calculated.

At a step S250, a constant Ts relative to a time lag in the fuel injection system is set in accordance with a battery voltage. Thereafter the actual fuel injection pulse width Ti is calculated at a step S251.

At a step S252, a fuel injection start timing ΘINJST is set by referring to a fuel injection start crank angle map MPΘINJST in accordance with the engine speed Ne and fuel injection pulse width Ti as parameters.

At steps S253 and S254, the weighting coefficient TNold of the last routine is rewritten with the new weighting coefficient TNnew and the intake air quantity Qold of the last routine is rewritten with the new intake air quantity Qanew.

The other operation of the second embodiment is the same as the first embodiment.

Figure 40:
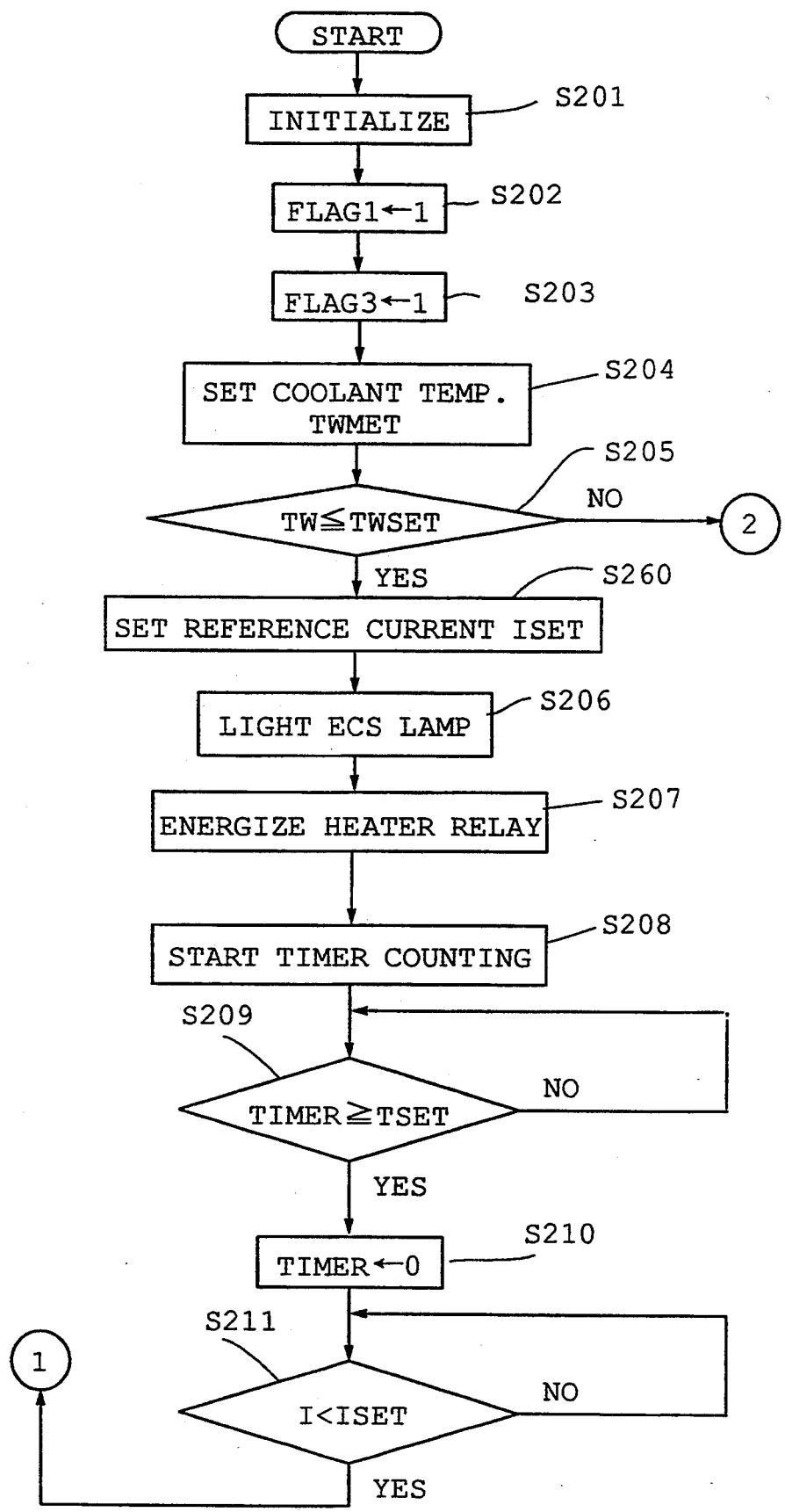
FIGS. 40 and 41 show a flowchart of a third embodiment.
Figure 41:
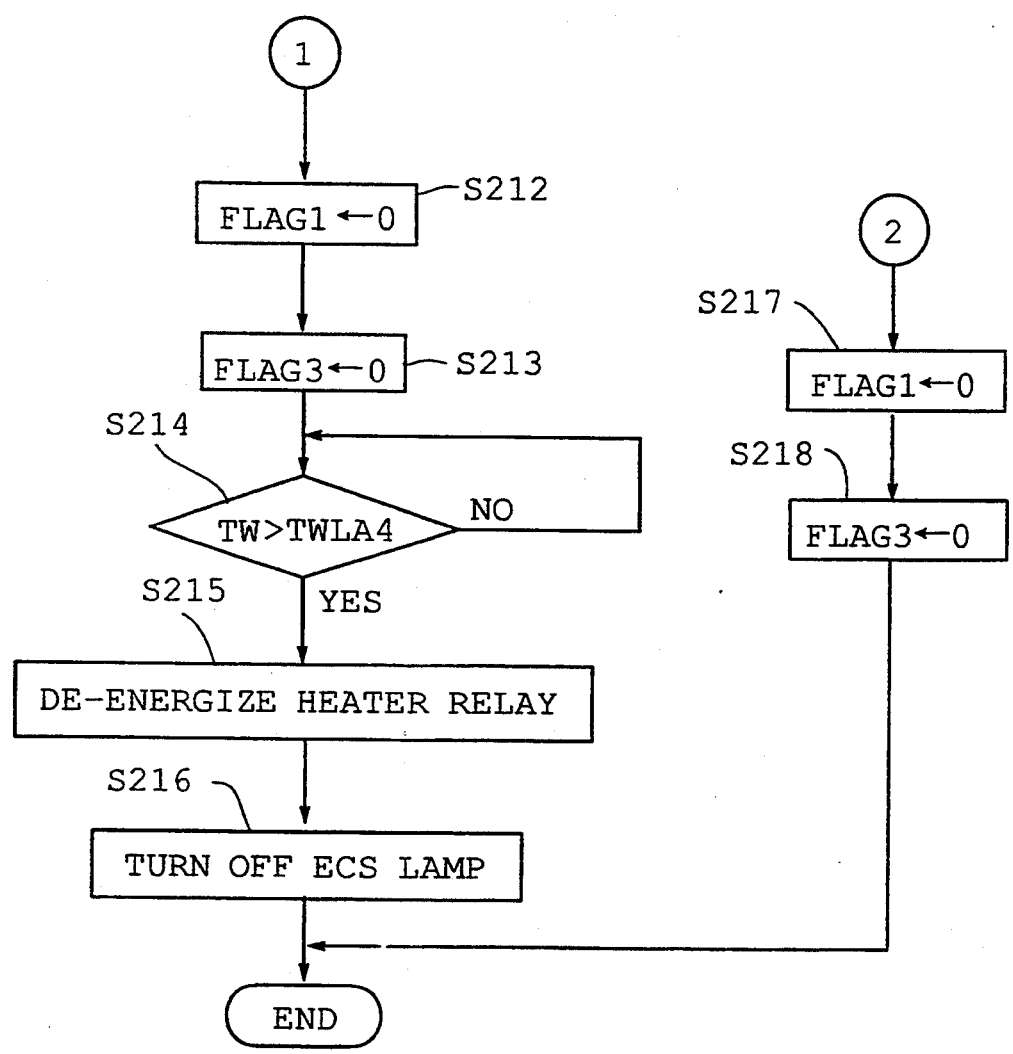

Referring to FIGS. 40 and 41 showing the third embodiment, a step S260 is provided between the steps S205 and S206 of FIG. 34. At the step 260, a reference heating current ISET is retrieved from a heating current map in accordance with the coolant temperature TW and the alcohol concentration M. The other procedure is the same as the second embodiment and the same blocks are identified with the same reference characters as the second embodiment.

Figure 42:
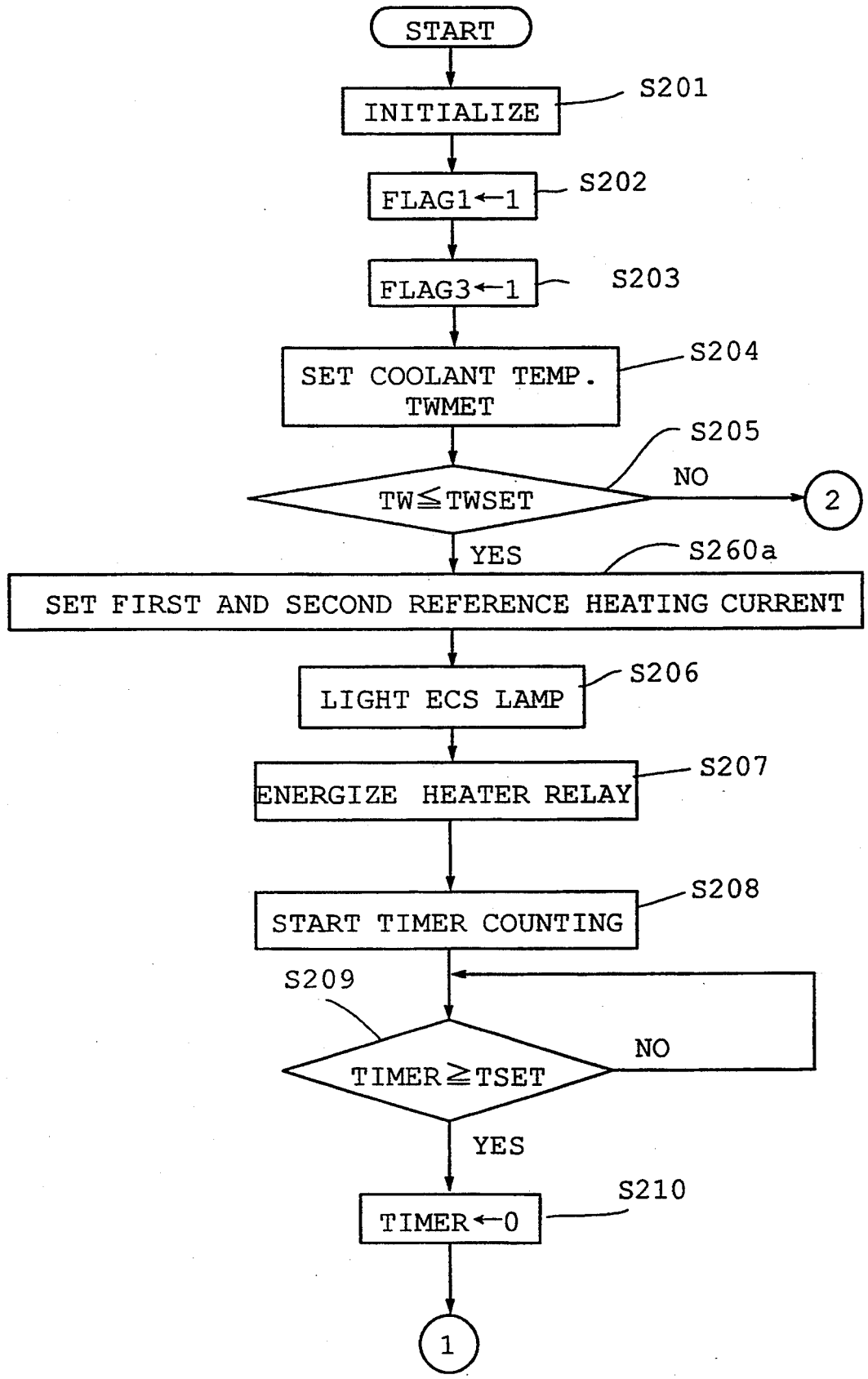
FIGS. 42 and 43 show a flowchart of a fourth embodiment.
Figure 43:
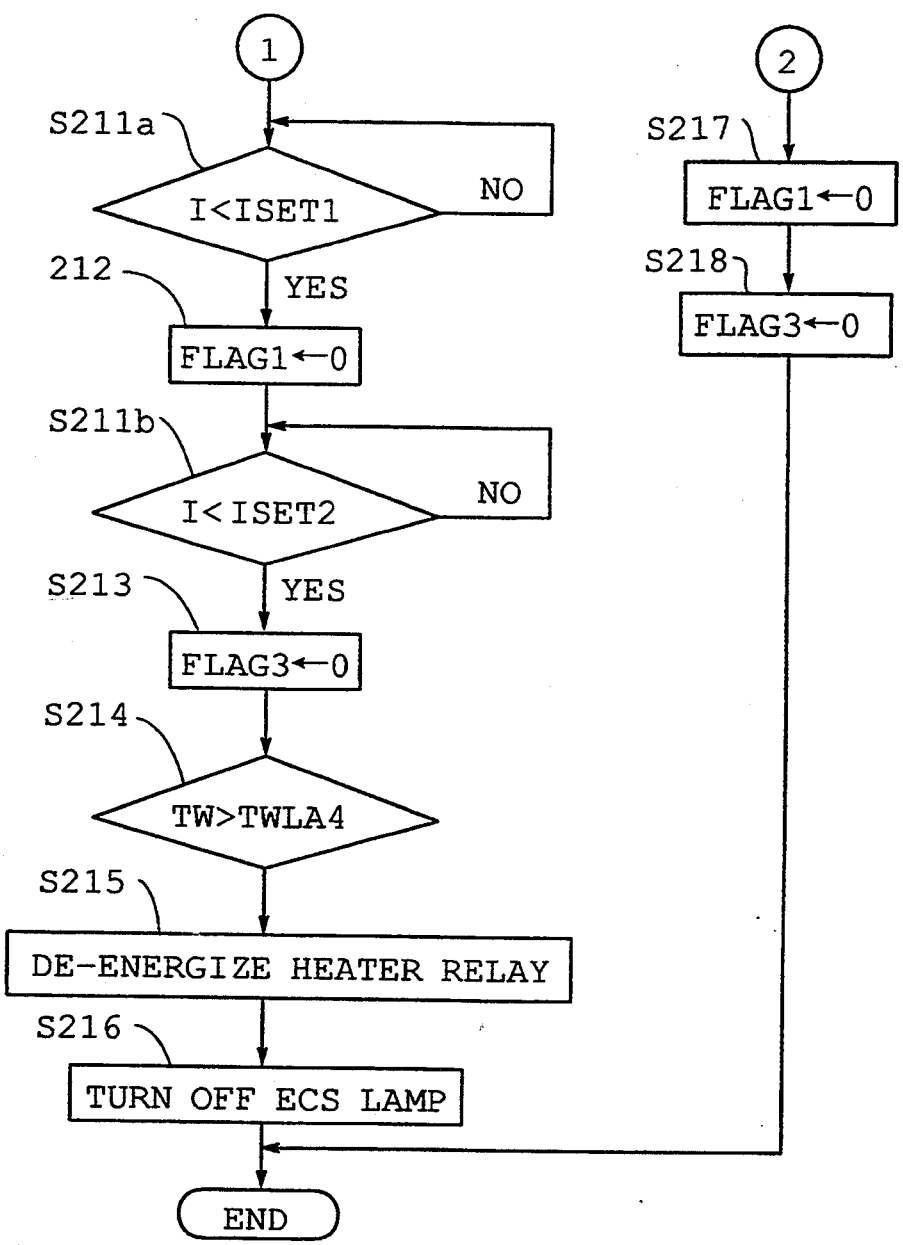

Referring to FIGS. 42 and 43 showing the fourth embodiment, the procedure is similar to that of FIGS. 40 and 41 except for steps S260a, S211a and S211b. At the step S260a, a first reference heating current ISET1 and a second reference heating current ISET2 which is smaller than the first heat current are retrieved from a heating current map in accordance with the coolant temperature TW and the alcohol concentration M.

At the step S211a, when I<ISET1, the starter current inhibitor flag FLAG 1 is reset. Accordingly, the starter motor 43 is operated to rotate the crankshaft of the engine, so that the combustion chambers are heated by the motoring. When the current I becomes lower than the second reference heating current ISET2 at the step S211b, the fuel injection inhibitor flag FLAG 3 is cleared at the step S213.

Figure 44:
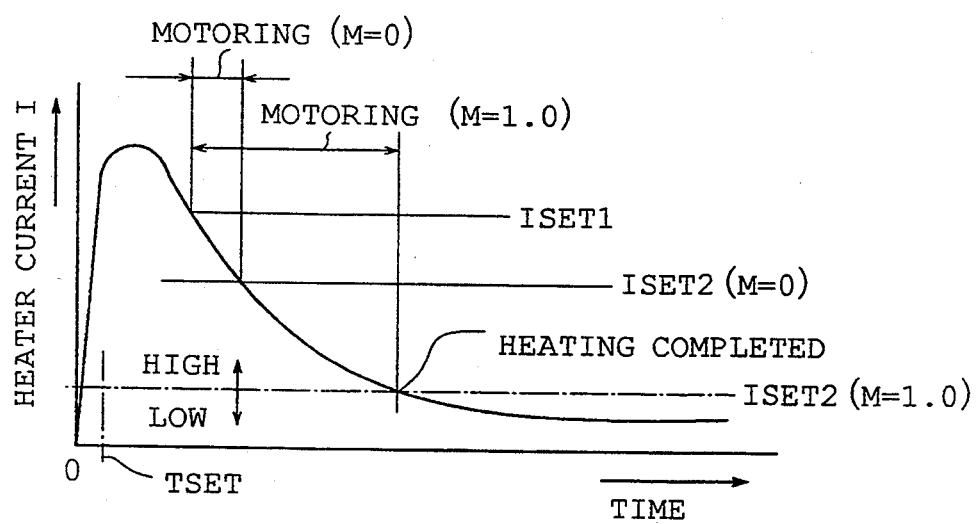
FIG. 44 is a graph showing a heater characteristic and motoring periods of the fourth embodiment.

FIG. 44 shows periods of the motoring at alcohol concentrations M=0 and M=1.0.

Figure 45:
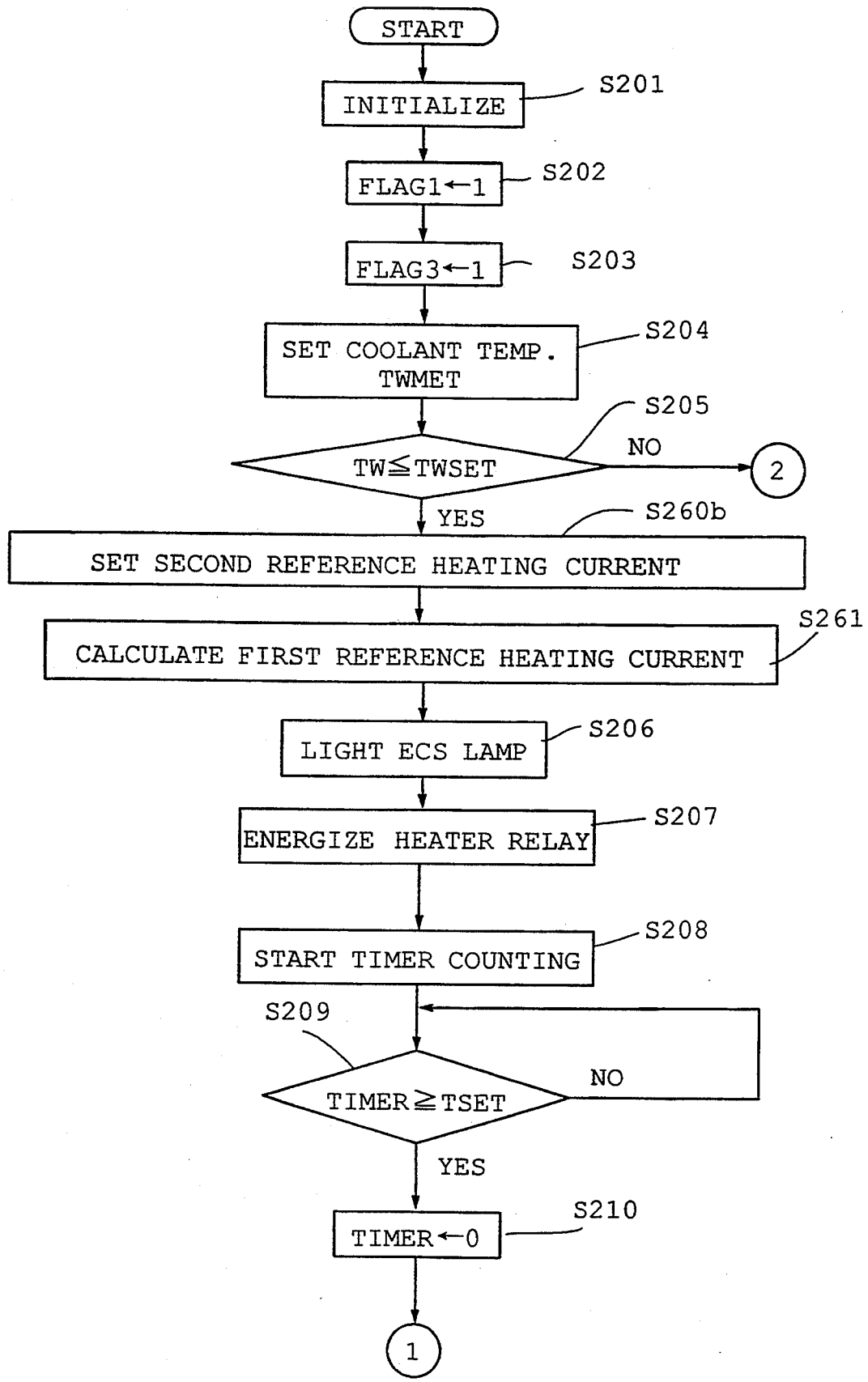
FIG. 45 shows a modification of the fourth embodiment.

In the modification of the fourth embodiment shown in FIG. 45, the second reference heating current ISET2 is set at a step S260b, and the first reference heating current ISET1 is calculated at a step S261 by adding a predetermined value IO to the second reference heating current ISET2.

Figure 46:
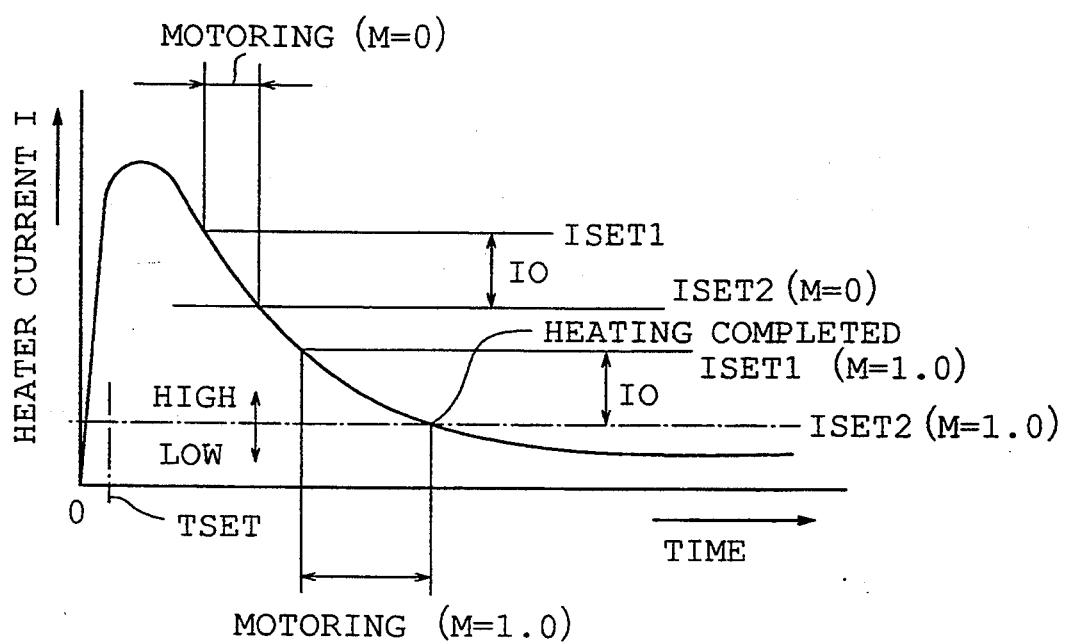
FIG. 46 is a graph showing motoring periods of the modification.

Thus, the motoring period changes with the alcohol concentration M and the coolant temperature TW as shown in FIG. 46. Consequently, an optimum motoring period is set, thereby increasing the temperature of the cylinders to reduce the warming up period.

Figure 47:
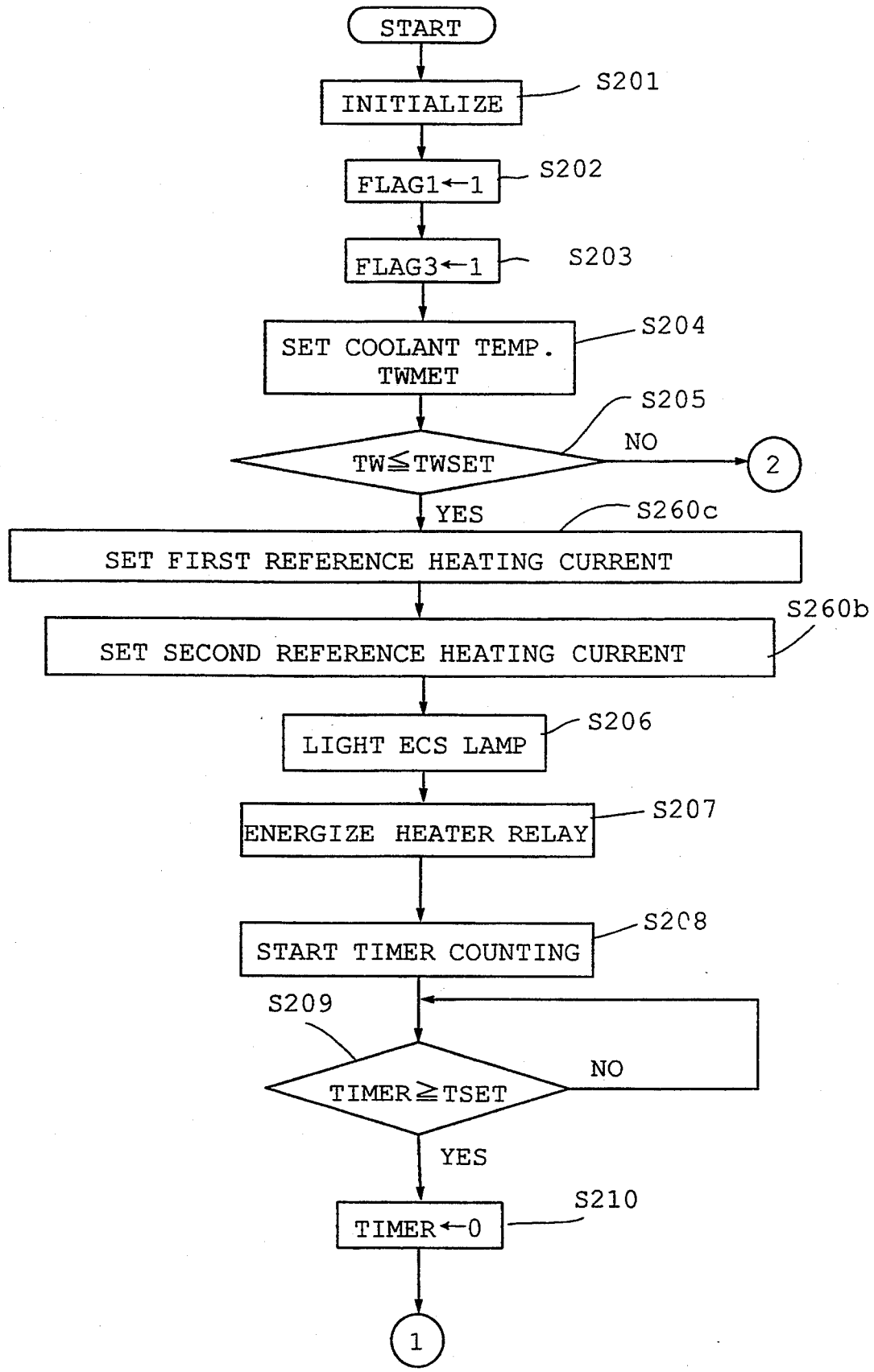
FIG. 47 shows another modification.
Figure 48:
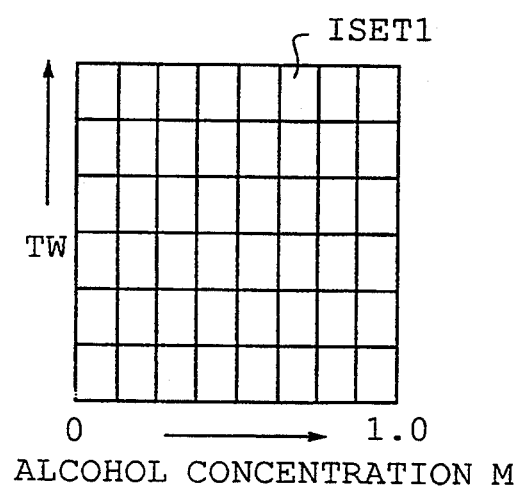
FIG. 48 shows a first reference heating current map.

In the modification of FIG. 47, the first reference heating current is retrieved from a first reference heating current map at a step S260c in accordance with the alcohol concentration M and the coolant temperature TW. FIG. 48 shows the first reference heating current map MPH1. Thus, the motoring period is further optimized by the program.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for controlling the start of an engine for a flexible fuel vehicle, said engine having an injector, a starter for cranking the engine and a heater provided in an intake port of the engine so as to heat fuel injected from said injector, comprising:

setting a start enabling engine temperature based on an alcohol concentration of fuel to be supplied to the engine;

determining whether the engine is in a start-unable state or start-able state by comparing an engine temperature with said set start enabling engine temperature;

inhibiting the operation of said starter and the fuel injection by said injector when said start-unable state is determined; and warming up said heater by supplying heater current thereto while the operation of said starter and the fuel injection are inhibited when said start-unable state is determined.

2. The method according to claim 1, further comprising:

determining whether the warming-up of said heater is completed by comparing said heater current with a predetermined current value; and allowing the operation of said starter and the fuel injection when the completion of the warming-up of said heater is determined.

3. The method according to claim 2, further comprising:

delaying the determination of the warming-up of said heater for a predetermined time period.

4. The method according to claim 2, further comprising:

setting said predetermined current value in accordance with at least one of said alcohol concentration and said engine temperature.

5. The method according to claim 1, further comprising:

comparing said heater current with a first predetermined current value;

allowing the operation of said starter when said heater current becomes smaller than said first predetermined current value;

comparing said heater current with a second predetermined current value, said second predetermined current value is smaller than said first predetermined current value; and allowing the fuel injection when said heater current becomes smaller than said second predetermined current value.

6. The method according to claim 5, further comprising:

setting said first and second predetermined current values in accordance with at least one of said alcohol concentration and said engine temperature.

7. The method according to claim 5, further comprising:

delaying the comparison of said heater current with said first and second predetermined current values for a predetermined time period.

8. The method according to claim 1, further comprising:

determining whether the warming-up of said heater is completed by comparing a heater power depending on said heater current with a predetermined power value; and allowing the operation of said starter and the fuel injection when the completion of the warming-up of said heater is determined.

9. The method according to claim 1, further comprising:

determining whether the engine warmup is completed by comparing said engine temperature with a predetermined engine warmup completion temperature when said start-able state is determined;

allowing the operation of said starter and the fuel injection by said injector when it is determined that the engine warmup is not completed; and operating said heater to heat fuel injected by said injection until said engine temperature reaches to said predetermined engine warmup completion temperature when it is determined that the engine warmup is not completed.

10. The method according to claim 1, further comprising:

determining whether the engine warmup is completed by comparing said engine temperature with a predetermined engine warmup completion temperature when said start-able state is determined; and allowing the operation of said starter and the fuel injection by said injector without operating said heater when it is determined that the engine warmup is completed.

11. A method for controlling the start of an engine for a flexible fuel vehicle, said engine having an injector, a starter for cranking the engine and a heater provided in an intake port of the engine so as to heat fuel injected from said injector, comprising:

setting a start enabling engine temperature based on an alcohol concentration of fuel to be supplied to the engine;

determining whether the engine is in a start-unable state or start-able state by comparing an engine temperature with said set start enabling engine temperature; and allowing the operation of said starter to crank the engine and the fuel injection by said injector while operating said heater to heat fuel injected by said injector until said engine temperature reaches a predetermined engine warmup completion temperature when it is determined that the engine warmup is not completed.

12. The method according to claim 11, further comprising:

allowing the operation of said starter and the fuel injection by said injector without operating said heater when it is determined that the engine warmup is completed.

13. An apparatus for controlling the start of an engine for a flexible fuel vehicle, said engine having an injector, a starter for cranking the engine and a heater provided in an intake port of the engine so as to heat fuel injected from said injector, comprising:

setting means for setting a start enabling engine temperature based on an alcohol concentration of fuel to be supplied to the engine;

determining means for determining whether the engine is in a start-unable state or start-able state by comparing an engine temperature with said set start enabling engine temperature;

inhibiting means for inhibiting the operation of said starter and the fuel injection by said injector when said start-unable state is determined; and warming means for warming up said heater by supplying heater current thereto while the operation of said starter and the fuel injection are inhibited when said start-unable state is determined.

14. The apparatus according to claim 13, further comprising:

determining means for determining whether the warmup of said heater is completed by comparing said heater current with a predetermined current value; and allowing means for allowing the operation of said starter and the fuel injection when the completion of the warming-up of said heater is determined.

15. The apparatus according to claim 14, further comprising:

delaying means for delaying the determination of the warming-up of said heater for a predetermined time period.

16. The apparatus according to claim 14, further comprising:

setting means for setting said predetermined current value in accordance with at least one of said alcohol concentration and said engine temperature.

17. The apparatus according to claim 13, further comprising:

first comparing means for comparing said heater current with a first predetermined current value;

first allowing means for allowing the operation of said starter when said heater current becomes smaller than said first predetermined current value;

second comparing means for comparing said heater current with a second predetermined current value, said second predetermined current value is smaller than said first predetermined current value; and second allowing means for allowing the fuel injection when said heater current becomes smaller than said second predetermined current value.

18. The apparatus according to claim 17, further comprising:

setting means for setting said first and second predetermined current values in accordance with at least one of said alcohol concentration and said engine temperature.

19. The apparatus according to claim 17, further comprising:

delaying means for delaying the comparison of said heater current with said first and second predetermined current values for a predetermined time period.

20. The method according to claim 13, further comprising:

determining means for determining whether the warming-up of said heater is completed by comparing a heater power depending on said heater current with a predetermined power value; and allowing means for allowing the operation of said starter and the fuel injection when the completion of the warming-up of said heater is determined.

21. The method according to claim 13, further comprising:

determining whether the engine warmup is completed by comparing said engine temperature with a predetermined engine warmup completion temperature when said start-able state is determined;

allowing the operation of said starter and the fuel injection by said injector when it is determined that the engine warmup is not completed; and operating said heater to heat fuel injected by said injection until said engine temperature reaches to said predetermined engine warmup completion temperature when it is determined that the engine warmup is not completed.

22. The method according to claim 13, further comprising:

determining means for determining whether the engine warmup is completed by comparing said engine temperature with a predetermined engine warmup completion temperature when said start-able state is determined; and allowing means for allowing the operation of said starter and the fuel injection by said injector without operating said heater when it is determined that the engine warmup is completed.

23. An apparatus for controlling the start of an engine for a flexible fuel vehicle, said engine having an injector, a starter for cranking the engine and a heater provided in an intake port of the engine so as to heat fuel injected from said injector, comprising:

setting means for setting a start enabling engine temperature based on an alcohol concentration of fuel to be supplied to the engine;

determining means for determining whether the engine is in a start-unable state or start-able state by comparing an engine temperature with said set start enabling engine temperature;

allowing means for allowing the operation of said starter and the fuel injection by said injector when it is determined the engine is in said start-able state; and operating means for operating said heater to heat fuel injected by said injection until said engine temperature reaches a predetermined engine warmup completion temperature when it is determined that the engine warmup is not completed.

24. The method according to claim 23, further comprising:

second allowing means for allowing the operation of said starter and the fuel injection by said injector without operating said heater when it is determined that the engine warmup is completed.

25. A method for controlling the start of an engine for a flexible fuel vehicle, said engine having an injector, a starter for cranking the engine and a heater provided in an intake port of the engine so as to heat fuel injected from said injector, comprising:

setting a start enabling engine temperature based on an alcohol concentration of fuel to be supplied to the engine;

determining whether the engine is in a start-unable state or start-able state by comparing an engine temperature with said set start enabling engine temperature;

inhibiting the fuel injection by said injector and the ignition when said start-unable state is determined; and warming up said heater by supplying heater current thereto and operating said starter to crank said engine for a predetermined time period while the fuel injection is inhibited when said start-unable state is determined; and allowing the fuel injection and the ignition after said predetermined time period.

26. An apparatus for controlling the start of an engine for a flexible fuel vehicle, said engine having an injector, a starter for cranking the engine and a heater provided in an intake port of the engine so as to heat fuel injected from said injector, comprising:

setting means for setting a start enabling engine temperature based on an alcohol concentration of fuel to be supplied to the engine;

determining means for determining whether the engine is in a start-unable state or start-able state by comparing an engine temperature with said set start enabling engine temperature;

inhibiting means for inhibiting the fuel injection by said injector and the ignition when said start-unable state is determined; and means for warming up said heater by supplying heater current thereto and for operating said starter to crank said engine, for a predetermined time period while the fuel injection is inhibited when said start-unable state is determined; and allowing means for allowing the fuel injection and the ignition after said predetermined time period.

* * * * *